United States Patent
Schwager et al.

(10) Patent No.: US 7,885,633 B2
(45) Date of Patent: Feb. 8, 2011

(54) POWER LINE COMMUNICATION METHODS AND DEVICES

(75) Inventors: Andreas Schwager, Kernen (DE);
Markus Zumkeller, Schwaikheim (DE);
Gralf Gaedeken, Burgwedel-Kleinburgwedel (DE);
Stephen Tiedemann, Stuttgart (DE);
Lothar Stadelmeier, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 666 days.

(21) Appl. No.: 11/576,634

(22) PCT Filed: Oct. 4, 2005

(86) PCT No.: PCT/EP2005/010673
§ 371 (c)(1),
(2), (4) Date: Jan. 23, 2008

(87) PCT Pub. No.: WO2006/037605
PCT Pub. Date: Apr. 13, 2006

(65) Prior Publication Data
US 2008/0260010 A1    Oct. 23, 2008

(30) Foreign Application Priority Data
Oct. 4, 2004    (EP) .................................. 04023603

(51) Int. Cl.
*H04M 9/00* (2006.01)
(52) U.S. Cl. ............. 455/402; 340/310.01; 340/310.06; 370/431; 370/482
(58) Field of Classification Search ................. 455/402; 340/310.01, 310.06; 370/431, 482
See application file for complete search history.

(56) References Cited

U.S. PATENT DOCUMENTS

| 3,943,296 | A | 3/1976 | O'Neill |
| 4,479,215 | A | 10/1984 | Baker |
| 6,249,213 | B1 | 6/2001 | Horne |
| 6,363,183 | B1 | 3/2002 | Koh |
| 6,417,762 | B1 | 7/2002 | Comer |
| 6,737,984 | B1 * | 5/2004 | Welles et al. ........... 340/870.02 |

(Continued)

FOREIGN PATENT DOCUMENTS

DE          100 26 930          12/2001

(Continued)

OTHER PUBLICATIONS

Halldorsson, Von Ulfur Ron et al.,"Modulation Fuer Powerline", Powerline Technik, vol. 71, No. 6, pp. 56, 58-61, 1998.

(Continued)

*Primary Examiner*—David Q Nguyen
(74) *Attorney, Agent, or Firm*—Oblon, Spivak, McClelland, Maier & Neustadt, L.L.P.

(57) ABSTRACT

A power line communication method for realizing data communication between at least one first or sending power line communication partner device and at least one second or receiving power line communication partner device. The method checks transmission conditions of a plurality of possible communication channels, thereby generating transmission condition data descriptive for the communication conditions of the respective possible communication channels. Additionally, communication conditions of the plurality of possible communication channels are selected as actual communication conditions based on the transmission condition data.

49 Claims, 20 Drawing Sheets

U.S. PATENT DOCUMENTS

| | | |
|---|---|---|
| 2002/0196732 A1 | 12/2002 | Mestdagh |
| 2004/0023678 A1 | 2/2004 | Fredriksson |
| 2005/0035850 A1* | 2/2005 | Schwager et al. ...... 340/310.01 |

FOREIGN PATENT DOCUMENTS

| | | |
|---|---|---|
| EP | 1 014 640 | 6/2000 |
| GB | 1 337 180 | 11/1973 |
| GB | 2 034 944 A | 6/1980 |
| GB | 2 106 285 A | 4/1983 |
| GB | 2 112 973 A | 7/1983 |
| GB | 2 358 563 | 7/2001 |
| GB | 2 383 724 | 7/2003 |
| JP | 2001-156685 | 6/2001 |
| JP | 2003-218831 | 7/2003 |
| JP | 2006-129470 | 5/2006 |
| WO | WO 89/02685 | 3/1989 |
| WO | WO 89/04093 | 5/1989 |
| WO | WO 99/25075 | 5/1999 |
| WO | 01 65703 | 9/2001 |
| WO | WO 02/25859 A1 | 3/2002 |
| WO | WO 02/102102 A1 | 12/2002 |
| WO | WO 03/013048 A2 | 2/2003 |
| WO | WO 03/013048 A3 | 2/2003 |

OTHER PUBLICATIONS

JP Office Action in English, Appln. No. 2005-291377, dated Aug. 24, 2010, pp. 1-3.

JP Office Action in English, Appln. No. 2007-535077, dated Aug. 24, 2010, pp. 1-8.

"Broadband Over Power Line", http://searchnetworking.techtarget.com/sDefinition/0,,sid7_gci953137,00.html, 1 page, Aug. 19, 2004.

"Powerline Communications (PLC) Network Solutions", Asoka USA, http://www.asokausa.com/knowledgebase/faq.php, 1 page, Sep. 9, 2004.

"Orthogonal Frequency-Division Multiplexing", http://searchnetworking.techtargetcom/sDefinition/0,,sid7_gci523666,00.html, 1 page, Aug. 19, 2004.

"Media Access Control Layer", http://searchnetworking.techtargetcom/sDefinition/0,,sid7_gci755784,00.html, 1 page, 119/08/2004.

"Mac Address", http://searchnetworking.techtarget.com/sDefinition/0,,sid7_gci212506,00.html, 1 page, Aug. 19, 2004.

* cited by examiner

POWER LINE COMMUNICATION METHODS AND DEVICES

The present invention relates to power line communication methods and devices.

More particular, the present invention relates to a power line communication method for realizing data transmission or data communication between at least one first or sending power line communication partner device and at least one second or receiving power line communication partner device. More specifically, the present invention relates to a dynamic frequency domain or FD coexistence method for power line communication systems and/or to a dynamic time domain or TD coexistence method for power line communication systems.

Although in recent years wireless communication technologies became more and more important power line communication networks and power line communication systems are still of interest and they participate in certain technology strategies. However, achieving a high degree of reliability is still a major task in the development and progress of power line communication technology.

Additionally, the following has to be noted:

In the field of communication arrangements and communication networks different kinds of devices for information exchange are often involved. For instance, so called power line communication modems or power line communication modem devices or PLC modems or PLC modem devices may be used which are adapted and designed to use power lines as a communication channel or a part thereof when communicating with respective communication partner devices.

Nowadays, known PLC modems in communication arrangements or communication networks of the art allocate a predefined communication spectrum of a possible communication frequency domain in a fixed manner. Therefore known communication schemes using PLC modem devices are beyond from being flexible. This is in particular a disadvantage in cases where the predefined communication spectrum with respect to a given communication channel suffers from low communication capabilities or communication features for instance because of signal distortions, signal damping, and/or noise taking place in the chosen communication channel and the predefined and selected communication spectrum.

It is an object underlying the present invention to provide a power line communication method in which disturbances of power line communication between power line communication partner devices by interferences from other power line communication systems or other systems or from noise sources can be reduced in a simple and reliable manner in order to increase the communication quality and the communication reliability as well as the data throughput possible via power line communication network strategies.

There are two concepts within the scope of the present invention.

According to a first concept of the present invention, the object underlying the present invention is achieved by a power line communication method with the features of independent claim 1. The object is further achieved by a system for power line communication, a device for power line communication, a computer program product, and a computer readable storage medium according to independent claims 17, 18, 34, and 35, respectively. Preferred embodiments of the method and the device for power line communication are within the scope of the respective dependent sub-claims.

In the following, the inventive method for power line communication according to the invention's first concept is described.

The inventive method for power line communication—according to the invention's first concept—is adapted in order to realize data communication between at least one first or sending power line communication partner device and at least one second or receiving power line communication partner device. The inventive method comprises a step (a) of checking transmission conditions of a plurality of possible communication channels between said at least one first or sending power line communication partner device and said at least one second or receiving power line communication partner device, thereby generating transmission condition data which are descriptive for the communication conditions of the respective possible communication channels. The inventive method further comprises a step (b) of selecting communication conditions of the plurality of possible communication channels as actual communication conditions based on said transmission condition data between said at least first or sending power line communication partner device and said at least one second or receiving power line communication partner device.

It is therefore a key idea of the present invention to monitor transmission conditions or receiving conditions of possible communication channels between power line communication partner devices between which a data communication or a data transmission shall be established or is in progress. According to the present invention the transmission conditions are described by transmission condition data. Based on said transmission condition data communication conditions with respect to the plurality of possible communication channels are selected or chosen as actual communication conditions for the actual communication to be established or for the actual communication in progress. According to these measures the quality of data communication or data transmission between power line communication partner devices can be maintained or increased by selecting a communication channel or by choosing the communication conditions which make possible a high quality of data communication or data transmission.

This means in other words, that by looking for possible foreign interferences and avoiding the same by avoiding respective channels, frequency bands, frequency spectra and/or time slots and/or by reducing transmission gain/power not only other PLC communicating partner devices are left undisturbed but also by the same measures interferences with communicating systems of other types—e.g. outside the PLC field and for instance amateur, AM or DRM radio services—are avoided or least reduced.

Said transmission condition data may preferably be generated in order to describe at least one of the group comprising a signal to noise ratio, time slots, frequency bands, channel capacities, interference signals from power line communication partner devices of said power line communication system or of other systems of possible power line communication channels.

Alternatively or additionally, said actual communication conditions may be chosen in order to effect and select at least one of the group comprising a frequency band, a time slot, a signal modulation scheme and an emission power of a possible or said actual communication channel of the plurality of possible communication channels between said at least one first or sending power line communication partner device and said at least one second or receiving power line communication partner device.

Said step (a) of checking said transmission conditions may preferably be carried out repeatedly.

Additionally or alternatively, said step (a) of checking transmission conditions may be carried out during a process of data communication in progress between said at least one first or sending power line communication partner device and said at least one second or receiving power line communication partner device.

Said step (b) of selecting said communication conditions may preferably be carried out repeatedly.

Additionally or alternatively, said step (b) of selecting said communication conditions is carried out during a process of data communication and progress between said at least one first or sending power line communication partner device and said at least one second or receiving power line communication partner device, in order to change its communication conditions for maintaining or increasing the actual data communication quality of the data communication between said at least one first or sending power line communication partner device and said at least one second or receiving power line communication partner device in progress.

It may be of advantage that said actual communication conditions are chosen according to a given threshold criterion, in particular with respect to at least one of said transmission parameters.

Additionally or alternatively, said actual communication conditions may be chosen in order to realize a best data communication, in particular with respect to a given threshold criterion, in particular with respect to at least one of said transmission parameters.

Further, the signal emission for data communication between said at least one first or sending power line communication partner device and said at least one second or receiving power line communication partner device may be reduced or avoided by said at least one first or sending power line communication partner device for frequency bands in which said at least one second or receiving power lien communication partner device does not listen and/or in which foreign sending devices or noise are present.

Further advantageously, the signal emission power for data communication between said at least one first or sending power line communication partner device and said at least one second or receiving power line communication partner device may be set in order to fulfill given emission power limit requirements with respect to chosen emission frequency bands.

Such a setting may be achieved based on radiated signals measured e.g. via an antenna and/or based on signals measured via an conducting path: FIG. 17. In the situation shown in FIG. 17 the evaluating and estimating unit EEU receives both signal types. i.e. information from both interfaces, namely the antenna interface AI and the power line interface PLI.

The data communication between said at least one first or sending power line communication partner device and said at least one second or receiving power line communication partner device may preferably be established according to a media access control or MAC structure.

A channel capacity may be evaluated according to Shannon's law and in particular according to the following formula (1):

$$C = \int_{t_{start}}^{t_{stop}} \int_{f_{start}}^{f_{stop}} ld(1+SNR) df dt \tag{1}$$

wherein C denotes the channel capacity, t denotes the time variable for data transmission, $t_{start}$ denotes the starting time, $t_{stop}$ denotes the stopping time, f denotes the frequency variable, $f_{start}$ denotes the starting frequency, $f_{stop}$ denotes the stopping frequency, ld(·) denotes the dual logarithmic function, and SNR denotes the respective signal-to-noise-ratio.

According to a further additional or alternate embodiment, for a plurality of time gaps with respective starting times $t_{start,1}, \ldots, t_{start,n}$ and stopping times $t_{stop,1}, \ldots, t_{stop,n}$ fulfilling the conditions $t_{start,j} \leq t_{start,j+1}$, $t_{stop,j} \leq t_{stop,j+1}$ and $t_{start,j} < t_{stop,j}$ for $j=1, \ldots, n$ and/or for a plurality of frequency gaps with respective starting frequencies $f_{start,1}, \ldots, f_{start,m}$ and stopping frequencies $f_{stop,1}, \ldots, f_{stop,m}$ fulfilling the conditions $f_{start,k} \leq f_{start,k+1}$, $f_{stop,k} \leq f_{stop,k+1}$, and $f_{start,k} < f_{stop,k}$ for $k=1, \ldots, m$ a full channel capacity $C_{full}$ may be evaluated according to the following formula (2a):

$$C_{full} = \sum_{j=1}^{n} \sum_{k=1}^{m} C_{j,k} \tag{2a}$$

wherein $C_{j,k}$ denotes the partial channel capacity for the $j^{th}$ time gap and the $k^{th}$ frequency gap and is determined according to Shannon's law and in particular according to the following formula (2b):

$$C_{j,k} = \int_{t_{start,j}}^{t_{stop,j}} \int_{f_{start,k}}^{f_{stop,k}} ld(1+SNR) df dt \tag{2b}$$

wherein t denotes the time variable for data transmission, f denotes the frequency variable, ld(·) denotes the dual logarithmic function, and SNR denotes the respective signal-to-noise-ratio.

Thereby a TD approach with a plurality of time gaps with respective starting times $t_{smart,1}, \ldots, t_{start,n}$ and stopping times $t_{stop,1}, \ldots, t_{stop,n}$ and/or a FD approach with a plurality of frequency gaps with respective starting frequencies $f_{start,1}, \ldots, f_{start,m}$ and stopping frequencies $f_{stop,1}, \ldots, f_{stop,m}$ is realized and the full available channel capacity or channel capability is the some of the respective partial channel capacities $C_{j,k}$.

Additionally or alternatively, a signal to noise ratio may be determined according to the following formula (3):

$$SNR = PSD_{feed} - ATT - NPSD_{receive} \tag{3}$$

wherein SNR denotes the respective signal to noise ratio, $PSD_{feed}$ denotes the feeding power spectral density, which is in particular known to all modems, $NPSD_{receive}$ denotes the noise power spectral density at a receiver, which is in particular measured by the receiving power line communication partner device, and ATT denotes the attenuation of a signal, in particular between said first or sending power line communication partner device and said second or receiving power line communication partner device.

According to a further preferred embodiment of the inventive method for power line communication a plurality of power line communication systems may be managed, in particular each having a plurality of power line communication partner devices and/or each without inter system communication between each of said systems of said plurality of power line communication systems.

In the following, the inventive device for power line communication according to the invention's first concept is described.

It is still a further aspect of the present invention to provide a power line communication system, which is adapted and/or arranged and which has means in order to realize the inventive method for power line communication.

It is still a further aspect of the present invention to provide a power line communication device which is adapted and/or arranged and which has means in order to realize a and/or to participate in a method for power line communication according to the present invention.

Also, a computer program product is provided according to the present invention which comprises computer means which is adapted and/or arranged in order to realize a method for power line communication according to the present invention and the steps thereof when it is executed on a computer, a digital signal processing means or the like.

Finally, a computer readable storage medium comprising a computer program product according to the present invention.

These and further aspects of the present invention will be further discussed in the following:

The present invention inter alia relates to a dynamic FD and/or TD coexistence method for power line communication system or PLC systems.

Power line networks are open networks. Signals from PLC system installed in adjacent flats may crosstalk to other PLC systems. Data—throughput of both systems is degraded due to this interference. This invention shows a method to share resources in Time and Frequency Domain that both systems do not interfere. Using this coexistence method, the total throughput of both systems is higher than if there is interference of the communication signals. There is no compatibility or data exchange needed between PLC systems.

Today, there is no coexistence present in PLC communication. PLC modems use permanent frequency allocations with maximum power possible. Signals of modems various vendors interfere and all systems have lower data throughput.

1 Time and Frequency Diversity for Known and Unknown Communication Systems in a Quasi Static Channel 1.1 Introduction Power line networks are open networks. The wires inside a building are connected to the transformer station. Each transformer station is connected to many houses. Often houses are daisy chained along the overhead cabling. Even inside a building several flats or living units are connected in the meter room or fuse cabinet. PLC signals crosstalk from one living unit to another. The cross talking signals are attenuated by the power meters or the distance between the living units or the buildings. The longer the distance, the less is the risk of the interference of a communication. Statistically in most cases a connection from one outlet inside a living unit to another outlet in another living unit is more attenuated than a connection between two outlets inside a flat. But in a very few cases the opposite was found. For the interference cases, a coexistence mechanism is needed. Theoretically coexistence problems can be solved in Time or Frequency domain.

1.2 Scenario

For example inside Flat 1 there is a power line communication or PLC communication from P1 (Plug 1) to P10. In the adjacent Flat, there is a communication from P15 to P21. PLC communication system from Flat 2 interferes to the PLC system installed in Flat 1.

The current invention shows a mechanism, how to minimize the influence of interference between the two PLC systems that are based on the same or on different architecture.

1.3 General Plc System Targets
  1. Two outlets that want to communicate to each other are making use of the best possible communication link in the time- and frequency-domain
  2. The communication link between two outlets are occupying only the undisturbed capacity in frequency and time.

1.4 Centralized Medium Access Control Or Mac Overview

The proposed invention is inter alia intended for centralized MAC architectures, where a central controller is responsible for the coordination of the time slot (channel) assignments for each MAC frame. A centralized MAC frame is typically divided into the following phases:

A broadcast phase where the central controller sends frame synchronization and resource allocation information (time slot or channel assignments) to the listening terminals.
  A downlink phase where data is sent from the central controller to one or more of the listening terminals.
  An uplink phase where terminals send data to the central controller.
  Optionally, a direct link phase where terminals send data directly to other terminals.
  A resource request phase where terminals may requests resource reservations in a random access fashion, i.e. all terminals content for the medium during this phase.

1.5 Adaptive Ofdm Overview

According to a preferred embodiment of the present invention PLC may use adaptive modulation schemes according to the current channel conditions. OFDM as a modulation scheme that consists of many orthogonal sub-carriers might be extended in a way that each sub-carrier can be adapted to its channel characteristic: Sub-carriers with good conditions choose high modulation scheme, allowing a high bit rate throughput. Sub-carriers with bad conditions choose a more robust modulation scheme, resulting in a lower bit rate throughput. Moreover, sub-carriers with very bad conditions can be left out. FIG. 3 shows an example of available SNR in a PLC channel: The y-axis represents the available SNR, the x-axis the frequency. Frequencies with high SNR choose modulation up to 1024 QAM. Decreasing SNR results in more robust modulation schemes, down to QPSK or even QPSK. Areas with very low SNR are notched out.

1.6 Allocation Of A Communication Link Between Two Outlets In A First Flat 1

A further embodiment of the invention my be realized at least in part according to the following processing steps:
  1. P10 is monitoring the amplitude or field strength over the PLC frame period or the PLC MAC frame period within the frequency band, e.g. 4 MHz to 30 MHz. P10 detects the time slot which has minimum interferer.
  2. P10 requests the data from P1 to be transmitted at the best time slot within one PLC frame. This may be coordinated by a master of centralized MAC.
  3. P1 sends 1st initial data packet with robust modulation pattern at defined time slot to P10.

4. P10 defines the frequency dependent modulation pattern out of the received signal from P1 and the measured interferer and noise (SNR calculation).
5. P10 requests data as ongoing payload from P1 with specific modulation pattern at specific time slot within the PLC frame.
6. P1 sends data to P10 with requested modulation pattern.

If P10 detects difficulties in time or frequency with the received data from P1, immediate retransmission will be requested at higher layer. Then P10 requests further data at a new timeslot within the PLC frame and/or with a new modulation pattern from P1.

1.7 Case 1: Plc System Of A Second Flat 2 Is A Fully Unknown Interferer

There is only limited gain from changing the time slot because time selective interferers (transmission from P15 to P21) are difficult to predict. However there is a good chance to avoid this interfere at least for some time.

1.8 Case 2: Plc System Of A Second Flat 2 Is A Known Plc Interferer, e.g. a Plc system with the same system Architecture As The Plc System In a First Flat 1

Changing the time slot provides a big advantage even if the two PLC systems are of first and second flats 1 and 2 not fully synchronized because the relative movement of the PLC frames is expected to be very slow as the clock deviation is very small.

1.9 Calculating Channel Capacity For Time Domain Approach

Using Shannon's law the channel capacity C within a time frame can be calculated according to the following formula (1):

$$C = \int_{t_{start}}^{t_{stop}} \int_{f_{start}}^{f_{stop}} ld(1+SNR) df dt. \quad (1)$$

In a TD approach with a plurality of time gaps with respective starting times $t_{start,1}, \ldots, t_{start,n}$ and stopping times $t_{stop,1}, \ldots, t_{stop,n}$ and/or a FD approach with a plurality of frequency gaps with respective starting frequencies $f_{start,1}, \ldots, f_{start,m}$ and stopping frequencies $f_{stop,1}, \ldots, f_{stop,m}$ the full available channel capacity or channel capability is the sum of the respective partial channel capacities $C_{j,k}$.

In this case, a plurality of time gaps with respective starting times $t_{start,1}, \ldots, t_{start,n}$ and stopping times $t_{stop,1}, \ldots, t_{stop,n}$ fulfilling the conditions $t_{start,j} \leq t_{start,j+1}$, $t_{stop,j} \leq t_{stop,j+1}$, and $t_{start,j} < t_{stop,j}$ for j=1, ..., n and/or for a plurality of frequency gaps with respective starting frequencies $f_{start,1}, \ldots, f_{start,n}$ and stopping frequencies $f_{stop,1}, \ldots, f_{stop,m}$ fulfilling the conditions $f_{start,k} \leq f_{start,m}$ and $f_{stop,k} \leq f_{stop,k+1}$, and $f_{start,k} < f_{stop,k}$ for k=1, ..., m are given. The full channel capacity $C_{full}$ is then evaluated according to the following formula (2a):

$$C_{full} = \sum_{j=1}^{n} \sum_{k=1}^{m} C_{j,k} \quad (2a)$$

wherein $C_{j,k}$ denotes the partial channel capacity for the $j^{th}$ time gap and the $k_{th}$ frequency gap and is determined according to Shannon's law and in particular according to the following formula (2b):

$$C_{j,k} = \int_{t_{start,j}}^{t_{stop,j}} \int_{f_{start,k}}^{f_{stop,k}} ld(1+SNR) df dt \quad (2b)$$

wherein t denotes the time variable for data transmission, f denotes the frequency variable, ld(·) denotes the dual logarithm function, and SNR denotes the respective signal-to-noise-ratio.

The signal-to-noise-ration SNR may be calculated a calculated according to the following formula (3):

$$SNR = PSD_{feed} - ATT - NPSD_{receive}. \quad (3)$$

$PSD_{feed}$ is the feeding power spectral density and is known to all modems. $NPSD_{receive}$ is the noise power spectral density at the receiver and is measured by the receiving modem. ATT denotes the attenuation which is measured by a pair of PLC modems or PLC devices.

In Time Domain approach the full available frequency spectrum is used. The capability of a transmission is sum of capability of all time frames.

1.10 Freeing Useless Frequency Bands

All PLC systems must be able to detect noise on the power line network and to omit the disturbed frequencies from their communication by e.g. notching OFDM carriers. Only frequencies with good SNR shall be used for the communication. Other frequencies (with bad SNR) shall be omitted. The receiving modem measures the available SNR that becomes the reference for selecting the carriers for communication at the transmitter site.

In the example of FIG. 1 there is following an attenuation from P1 to P10 as is shown in FIG. 5. The transmitted signal has 0 dB attenuation at P1. At P10 the receiving signal is attenuated as shown in FIG. 5.

In the following these and further aspects of the present invention will be explained in more detail based on preferred embodiments of the present invention and by taking reference to the accompanying figures which schematically demonstrate aspects of the present invention. The red curve in FIG. 6 shows the attenuation from P15 to P10, which is identical to the interference to P10 caused by the communication between P15 and P21. The example in FIG. 6 shows a rare case, where the interference signals from outside are in meridian less attenuated than the signals from inside the Flat. Even under this constrains, there are some frequency ranges where the desired connection has less attenuation than the interfering signals.

At frequencies where the interfered signal is higher than the desired signal, e.g. 4 to 10 MHz, 13 to 16 MHz and 20 to 30 MHz, no communication is possible from P1 to P10. So these frequencies shall be omitted, without loosing any bit rate. After notching these frequencies the received signal looks like shown in FIG. 7.

The blue areas mark the SNR that can be used by the communication from P1 to P10. As a consequence the freed frequencies can be used by other adjacent PLC systems, e.g. PLC system in Flat 2. In case Flat 2 operates in the same way as the system in Flat 1 the communication from P15 to P21 could omit those frequencies used by flat 1. This offers an extended SNR for flat 1 and therefore higher bit rate (see FIG. 8).

If this coexistence mechanism is implemented to power line modems or devices, the dynamic notching for SW radioprotection is already included, because frequencies with low SNR caused by SW broadcast signals will be omitted.

1.11 Calculating The Channel Capacity For Frequency Domain Approach

Again, according Shannon's law shown in formula (1) the channel capacity C may be calculated. Here one or several frequency spans are used for the communication permanently.

1.12 Power Back Off

Similar behavior as described for the frequency domain can be applied to the transmitted power level in order to reduce the interference potentials.

For the possible calculation of the channel capability C according to formulas (1) and (2) the value of $PSD_{feed}$ is reduced, the full available spectrum is used permanently.

Actual communication conditions may be chosen in order to effect and select at least one of the group comprising a frequency band, a signal modulation scheme, a time slot, an emission power or transmission power, transmission gain and reception gain each of a possible or of said actual communication channel $Ch1, \ldots, Chn$ of the plurality of possible communication channels $Ch1, \ldots, Chn$ between said at least one first or sending power line communication partner device P1 and said at least one second or receiving power line communication partner device P10.

The power back off process may be designed in order to avoid interference with other power line communication services and/or radio services by reducing transmission power fed or to be fed.

In said power back off process transmission power fed or to be fed may be reduced to a minimum value or range which is still sufficient and/or appropriate for enabling and/or maintaining loss free or essentially loss free power line communication.

Said power back off process may be performed individually for one or a plurality of different channels and/or carriers.

Said power back off process may also be performed on a distinct channel and/or carrier if an actual signal to noise ratio of said given channel and/or carrier is better than a signal to noise ratio necessary for an actual bit loading in said given channel and/or carrier.

Power line communication may be performed with a transmission gain and/or transmission power on the transmission side which fits to at least one of a maximum sensitivity, maximum input gain and minimum input attenuation on a receiving side.

Said transmission gain and/or transmission power of said transmission side may be at least one of set, requested, communicated and negotiated by or with said receiving side.

Said power back off process may be performed in order to adjust transmission gain and/or transmission power in accordance to at least one of attenuations and distances to be bridged between devices under communication, in particular in order to reduce said transmission gain and/or transmission power for comparable short distances.

Transmission gain and/or transmission power may be raised in order to increase a possible quality of service value or QoS value for quality of service data streams or QoS streams.

Information and/or signal components which need a higher QoS value may be assigned and mapped to certain carriers and said certain carriers may be given an increased amplitude and/or transmission power in the power line communication process.

Said increased amplitude and/or transmission power for the power line communication process may be achieved by operating a respective spectral interleaver device in order to assign and map said information and bits which need a higher QoS value to said respective carriers.

1.13 Device And Components View Of The Invention'S Embodiments

In FIG. 9 for an embodiment of an inventive receiving PLC partner device P10 an AFE or analog front end is comprised and the calculation of best amplitude, time and frequency span is novel in this invention when compared to the state of the art PLC modems today. The respective information may be send back to the transmitting modem or device.

In FIG. 10 for an embodiment of an inventive sending PLC partner device P1 the PSD or power spectral density is set and the transmitting modem or PLC device gets the information about best power settings, timing and frequency allocations. This information is forwarded to the modules in the MAC and physical layers MAC and PHY. The MAC layer MAC is responsible when the PLC modem or device P1 transmits data. The physical layer PHY places the notches or carriers of the OFDM transmission according to the best throughput conditions.

1.14 Conclusion

Some properties of state of the art communication technology are listed in the following:
1. Make use of coding together with time and frequency interleaving within a channel that is varying over time and frequency. Useful and efficient for fast changing channels
2. State of the art OFDM systems, e.g. wireless systems, do not use the benefits of quasi-static channels like PLC.
3. Allocating fixed frequency blocks for different users realizes coexistence.
4. Allocating fixed time slots for different users realizes coexistence (synchronized systems are needed).
5. Having enough distance to other users enables coexistence (strong attenuation between users)

Some possible properties of the new approach are listed in the following:
1. System may be realized adapt fast to changing channels. The overhead is only spend during the changes of the channel. This is efficient for quasi static channels.
2. Unused frequency blocks may become available for others.
3. Fully synchronized systems may be not required to make use of free timeslots.
4. System can make use of the specific channel conditions between nodes and external or outside interference.
5. The coexistence mechanism (Frequency Domain, Time Domain or Power Domain) that provides maximum channel capacity or channel capability shall be used for the communication.

According to a second concept of the present invention, the object underlying the present invention is achieved by a method for operating a PLC modem device. Additionally the object is achieved by a method for operating a communication arrangement, a PLC modem device, a communication arrangement, a computer program product, as well as with a computer readable storage medium. Preferred embodiments of the method and the device for power line communication are within the scope of the respective dependent sub-claims.

According to the present invention one the one a method for operating a PLC modem device in a communication arrangement is proposed wherein the presence of interferences from other PLC modem devices or from radio services is monitored and wherein in the case that interferences from other PLC modem devices or from radio services are detected power line communication is at most performed on communication channels or communication spectra where said interferences from other PLC modem devices or from radio services are not detected. Thereby, simultaneously interferences to and from other PLC modem devices and radio services are avoided.

The method for operating a PLC modem device according to the present invention is adapted in particular for PLC modem device operation in a communication network or in a communication arrangement. The inventive method on the other hand comprises a step of generating and/or providing communication quality data and/or of at least one communication channel, a step of determining at least communication spectrum data and communication channel data, a step of determining and/or selecting a communication spectrum and/or a communication channel, and a step of communicating with at least one communication partner device via said selected communication channel and/or said selected communication spectrum. The respective communication quality data are generated and/or provided with respect to at least one communication channel between said PLC modem device and at least one communication partner device. Said communication quality data are descriptive at least for communication capabilities, a communication quality and/or for communication features at least of said at least one communication partner device and/or of said at least communication channel. Said communication spectrum data and/or said communication data are determined based on said communication quality data and they are descriptive for at least one communication spectrum for said PLC modem device and/or for said at least one communication channel each of which with respect to said at least one communication partner device. Said communication spectrum and/or said communication channel are determined and/or selected from at least one communication channel each of which on the basis of said communication spectrum data and/or said communication channel data.

It is therefore a basic idea of the present invention to enable a PLC modem device to generate and/or to provide data describing communication capabilities, communication quality and/or communication features of at least one communication partner device and/or of at least one communication channel for communication with said at least one communication partner device. These data are called communication quality data as they are described in the broad sense the quality of possible communication.

The invention can also be applied to PLC technology. Also, wireless transmissions and technologies are thinkable.

The invention preferably affects all modems participating to the communication. Or even these modems who are not participating to the communication or belonging to an other system are affected, because of interoperability or coexistence. A PLC system comprises several modems communicating to each other. There might be several PLC systems connected to one Power line.

By a measurement process at least one of possible communication channels and communication spectra are monitored within said step of at least one of generating and providing said communication quality data.

In said step of at least one of determining and selecting at least one of a communication spectrum and a communication channel at least one of an actual communication spectrum and an actual communication channel is selected and chosen for said step of communicating for which a comparable low interference from signal sources or signals other than the communication partner devices associated in said step communicating and the signal stemming there from, respectively, may be given.

Thereby avoiding and de-allocating partly or completely least one of communication spectra and communication channels of devices and services other than devices and services associated in said step of communication can be achieved.

Thereby avoiding and de-allocating partly or completely at least one of communication spectra and communication channels associated with one or a plurality of amateur, AM or DRM radio services can be achieved.

This means in other words, that by looking for possible foreign interferences and avoiding the same by avoiding respective channels, frequency bands, frequency spectra and/or time slots and/or by reducing transmission gain/power not only other PLC communicating partner devices are left undisturbed but also by the same measures interferences with communicating systems of other types—e.g. outside the PLC field and for instance amateur, AM or DRM radio services—are avoided or least reduced.

Said measurement process may be performed wirelessly.

Said measurement process may be performed by means of an antenna as a part of said PLC modem device.

Said measurement process may also be performed by wire.

Said measurement process may further be performed by means of a sensor means connected to a respective communication wire means.

The actual communication conditions may be chosen in order to effect and select at least one of the group comprising a frequency band, a signal modulation scheme, a time slot, a transmission power, a transmission gain and a reception gain each of a possible or of said actual communication channel of the plurality of possible communication channels between said at least one first or sending power line communication partner device and said at least one second or receiving power line communication partner device.

Further, a power back of process may be comprised in order to avoid interference with other power line communication services and/or radio services by reducing transmission power fed or to be fed.

In said power back off process transmission power fed or to be fed may be reduced to a minimum value or range which is still sufficient and/or appropriate for enabling and/or maintaining loss free or essentially loss free power line communication.

Said power back off process may be performed individually for a plurality of different channels and/or carriers.

Said power back off process may be performed on a distinct channel and/or carrier if an actual signal to noise ratio of said given channel and/or carrier is better than a signal to noise ratio necessary for an actual bit loading in said given channel and/or carrier.

Power line communication may be performed with a transmission gain and/or transmission power on the transmission side which fits to at least one of a maximum sensitivity, maximum input gain and minimum input attenuation on a receiving side.

Said transmission gain and/or transmission power of said transmission side may be at least one of set, requested, communicated and negotiated by or with said receiving side.

Said power back off process may be performed in order to adjust transmission gain and/or transmission power in accordance to at least one of attenuations and distances to be bridged between devices under communication, in particular in order to reduce said transmission gain and/or transmission power for comparable short distances.

Information and/or signal components which need a higher QoS value may be assigned and mapped to certain carriers and said certain carriers may be given an increased amplitude and/or transmission power in the power line communication process.

Said increased amplitude and/or transmission power for the power line communication process may be achieved by operating a respective spectral interleaver device in order to assign and map said information and bits which need a higher QoS value to said respective carriers.

The transmission gain and/or transmission power may be raised in order to increase a possible quality of service value or QoS value for quality of service data streams or QoS streams.

Said process of raising said transmission gain and/or transmission power may be performed in a way still enabling and/or maintaining avoiding and de-allocating partly or completely least one of communication spectra and communication channels of devices and services other than devices and services associated in said step of communication and/or avoiding and de-allocating partly or completely at least one of communication spectra and communication channels associated with one or a plurality of amateur, AM or DRM radio services.

It is a further idea of the present invention to use said communication quality data so as to determine communication spectrum data and/or communication channel data on the basis of said communication quality data. Said communication spectrum data and/or said communication channel are chosen to be descriptive for at least one communication spectrum for said PLC modem device and/or for said at least one communication channel each of which in relation to said at least one communication partner device. Based on said communication spectrum data and/or on said communication channel data a communication spectrum is determined and/or selected for a possible communication with said communication partner device. Additionally or alternatively said communication spectrum data and/or said communication channel data are used as a basis for determining and/or for selecting a respective communication channel too for realizing said communication process between said PLC modem device and said communication partner device.

According to a further or alternative aspect of the present invention the inventive method comprises a step of detecting at least one communication partner device which is connected to said PLC modem device via at least one communication channel.

Additionally or alternatively, also a step of detecting said at least one communication channel between said PLC modem device and at least one communication partner device itself may be comprised.

In a preferred embodiment of the inventive method for operating a PLC modem device said step of generating and/or providing communication quality data comprises a process of determining and/or measuring noise of said at least one communication channel, in particular of a power line thereof.

Further additionally or alternatively said step of generating and/or providing communication quality data may comprise a process of determining and/or measuring a signal attenuation, a signal transmission level, a distance of said PLC modem device to said communication partner device and/or a signal-to-noise-ratio or with respect to said at least one communication channel, in particular of or with respect to a power line thereof. The case of determining and/or measuring a signal-to-noise-ratio this may be realized based on said noise, attenuation, signal transmission level, distance determined and/or measured.

It is further preferred to analyze for said at least one communication partner device a plurality of communication channels, in particular all available communication channels for said communication partner device, in particular within said steps of detecting said at least one communication partner device and/or said at least one communication channel, within said step of generating and/or providing said communication quality data, within said step of determining at least said communication spectrum data and/or said communication channel data, and/or within said step of determining and/or selecting said communication spectrum and/or said communication channel.

According to a further and advantageous embodiment of the inventive method for operating a PLC modem device a communication spectrum and/or a communication channel may be selected and/or used which are not simultaneously used or allocated by communication processes of and/or between other communication partner devices within said communication network or communication arrangement, in particular within said step of determining and/or selecting a communication spectrum and/or a communication channel.

According to a further preferred embodiment of the inventive method for a communication channel having or realizing a comparable larger or comparable large communication distance between said PLC modem device and said selected communication partner device a comparable lower or comparable low frequency range is chosen for said communication spectrum, in particular within said step of determining and/or selecting a communication spectrum.

Additionally or alternatively for a communication channel having or realizing a comparable shorter or comparable short communication distance between said PLC modem device and said selected communication partner device a communication spectrum with a comparable high or comparable higher frequency range is chosen, in particular within said step of determining and/or selecting a communication spectrum.

A further preferred embodiment of the inventive method is provided, wherein a process of checking the presence, existence and/or activity of other and external radio sources and/or radio services is performed, in particular within said step of generating and/or providing communication quality data, within said step of determining at least communication spectrum data and/or communication channel data, and/or within said step of determining and/or selecting a communication spectrum and/or a communication channel, wherein said communication quality data, said communication spectrum data, said communication channel data, said communication spectrum and/or said communication channel are chosen or selected in order to avoid spectral ranges where other and external radio sources and/or radio services exist, are present and/or are active, in order to reduce and/or avoid disturbances and/or interferences with, to and/or from other and external radio sources and/or radio services.

Still a further preferred embodiment is proposed, wherein within said process of checking the presence, existence and/or activity of other and external radio sources and/or radio services PLC modem devices snoop in the air if there are any radio services and/or radio sources available and wherein—if a relevant service and/or source is found at any frequency location—the respective frequency band is omitted in power line communication.

Additionally or alternatively it is proposed that said process of checking the presence, existence and/or activity of other and external radio sources and/or radio services is performed in a wireless manner and/or in a wired manner.

It is a further aspect of the present invention to provide a method for operating a communication arrangement or a communication network, said communication arrangement or said communication network comprising a plurality of PLC modem devices, wherein for each of said PLC modem devices the method for operating a PLC modem device according to the present invention is performed.

Thereby by fair avoidance a process avoiding and de-allocating at least one of communication spectra and communication channels associated with at least one of amateur, AM and DRM radio services can be achieved.

An alternative or additional embodiment is provided, wherein a pre-defined reference signal is generated by at least one PLC modem device and transmitted via at least one available communication channel, wherein possible communication partner devices measure said pre-defined reference signal via said at least one available communication channel and/or analyze the respective measurement data, wherein based on said measurements said communication quality data, said communication spectrum data, said communication channel data, said communication spectrum and/or said communication channel are chosen or selected, in particular in order to avoid spectral ranges where other and external radio sources and/or radio services exist, are present and/or are active.

Still an alternative or additional embodiment is provided, wherein a pre-defined reference signal is generated by at least one PLC modem device and transmitted via at least one available communication channel, wherein possible communication partner devices measure said pre-defined reference signal via channels other than said available communication channels and/or analyze the respective measurement data, wherein based on said measurements said communication quality data, said communication spectrum data, said communication channel data, said communication spectrum and/or said communication channel are chosen or selected, in particular in order to avoid spectral ranges where other and external radio sources and/or radio services exist, are present and/or are active.

Still a further embodiment is proposed, wherein said PLC modem device measures the radiation of the power line channel where it is connected to, wherein one modem device sends a well known signal as a reference signal on the power lines channels and all participating modems receive and/or measure this signal over a wireless channel, in particular with their terrestrial antenna, wherein with this measurement the modem devices determine the radiation of the power line channel depending on frequency, and wherein the result of this measurements is exchanged to all modem devices in order to not use or to avoid the frequencies or spectral ranges with respect to the relevant radiation for PLC communication.

Additionally or alternatively, said at least one PLC modem device and/or said possible communication partner devices communicate and/or transmit the respective measurement data, its respective analysis results, said communication quality data, said communication spectrum data, said communication channel data, said communication spectrum and/or said communication channel to said possible communication partner devices and/or said at least one PLC modem device.

Further it is proposed that said processes of generating, of transmitting said pre-defined reference signal, of measuring, of analyzing the measurement, and/or of communicating the respective data to said possible communication partner devices and/or said at least one PLC modem device are performed during said step of generating and/or providing communication quality data, within said step of determining at least communication spectrum data and/or communication channel data, and/or within said step of determining and/or selecting a communication spectrum and/or a communication channel.

It is a further aspect of the present invention to provide a PLC modem device which is capable of and/or comprises means for realizing the method for operating a PLC modem device according to the present invention.

A PLC communication or modem device according to the present invention may comprise means for monitoring a presence of interferences caused by operating other PLC modem devices, caused by a communication line used for own power line communication and/or from operating radio services and may comprise means for performing power line communication in the case that interferences from said operating other PLC modem devices, form said communication line used for own power line communication and/or from said operating radio services are detected at most or essentially on communication channels or communication spectra where said interferences from other PLC modem devices or from radio services are not detected, and is thereby adapted for simultaneously avoiding interferences to and from other PLC modem devices and radio services.

According to the present invention said PLC modem device comprises means for performing a step of at least one of generating and providing communication quality data with respect to at least one communication channel between said PLC modem device and at least one communication partner device, said communication quality data being descriptive for at least one of communication capabilities, communication quality and communication features of at least one of said at least one communication partner device and said at least one communication channel, means for performing a step of determining at least one of communication spectrum data and communication channel data based on said communication quality data and being descriptive for at least one of at least one communication spectrum for said PLC modem device and for said at least one communication channel each of which with respect to said at least one communication partner device, means for performing a step of at least one of determining and selecting at least one of a communication spectrum and a communication channel from said at least one communication channel each of which based on at least one of said communication spectrum data and on said communication channel data, and means for performing a step of communicating with said at least one communication partner device via at least one of said selected communication channel and said selected communication spectrum.

Said PLC modem device is according to the present invention adapted in order to monitor by a measurement process at least one of possible communication channels and communication spectra within said means for performing said step of at least one of generating and providing said communication quality data.

Said means for performing said step of at least one of determining and selecting at least one of a communication spectrum and a communication channel is adapted to at least one of select and choose at least one of an actual communication spectrum and an actual communication channel for said step of communicating for which a comparable low interference from signal sources or signals other than the communication partner devices associated in said step communicating and the signal stemming there from, respectively, is given.

Thereby PLC modem device is adapted in order to avoid and de-allocate partly or completely at least one of communication spectra and communication channels of devices and services other than devices and services associated in said step of communication.

Thereby PLC modem device is adapted in order to avoid and de-allocate partly or completely at least one of communication spectra and communication channels associated with one or a plurality of amateur, AM or DRM radio services.

Preferably, said inventive PLC modem device may comprise means for at least one of wirelessly and by wire receiving at least one of radio sources and radio services.

Further, said inventive PLC modem device may comprise at least one of a terrestrial tuner device and an antenna device for receiving at least one of radio sources and radio services.

A PLC communication or modem device according to the present invention may comprise an antenna device and an antenna interface (AI) connected thereto for receiving radio sources and/or radio services and for feeding and providing respective signals for evaluation.

A PLC communication or modem device according to the present invention may comprise a power line sensing means and/or a terrestrial tuner device as well as a power line interface connected thereto for receiving radio sources and/or radio services and for feeding and providing respective signals for evaluation.

A PLC communication or modem device according to the present invention may comprise an evaluating and estimation unit for evaluating radiations and/or noise and for estimating channel.

A PLC communication or modem device according to the present invention may comprise a central processing unit or CPU which is connected to said antenna interface and/or to said power line interface, in particular for controlling the same.

Additionally, it is a further aspect of the present invention to provide a communication arrangement or a communication network, which is capable of and/or comprises means for realizing the method for operating a communication arrangement according to the present invention and/or the steps thereof and/or which comprises a plurality of PLC modem devices according to the present invention.

Furthermore, a computer program product is provided according to the present invention which comprises computer program means which is capable of performing and/or realizing the method for operating a PLC modem device according to the present invention and/or the method for operating a communication arrangement according to the present invention and/or the steps thereof, when it is executed on a computer, a digital signal processing means and/or the like.

Finally, a computer readable storage medium is provided by the present invention which comprises a computer program product according to the present invention.

In the following, these and further aspects of the second concept of the pre-sent invention will be elucidated in more detail taking account to the following remarks:

The present invention relates in particular to the spectrum placement of PLC communication.

Depending on e.g. measured SNR and distance between communicating PLC modems their Communication Spectrum shall be placed in the frequency domain.

Known PLC Modems today allocate a predefined communication spectrum in frequency domain. Therefore, known PLC Modems today do not use the available bandwidth efficiently. According to the present invention this is optimized by intelligent placement of the Communication spectrum.

Using better spectrum placements coexistence problems between PLC modems can be solved.

Available Bandwidth can be used more efficiently which results in higher throughput capabilities.

Every node participating in PLC communications measures Noise on the power line, attenuation and distance to the communication partner.

With the knowledge of the transmission level, attenuation and noise the available SNR can be calculated. Channel capabilities can be calculated for various possible communication windows of the SNR graph. The new initiated communication shall be placed to a frequency location where the calculated Channel Capability fits best to the demanded transmission capability.

If a later starting communication decides to use the same frequency location that was already allocated by an other communication the communication of the shorter distance between the modems shall move to a second "best fit" location at a higher frequency. The communication via the longer distance shall use the spectrum at lower frequencies.

The background behind this mechanism is:

Statistically PLC Channel via longer distances between the modems have higher attenuation than short distance communication. To use frequency spectrum efficient short distance communication shall use higher frequencies, long distance communication shall use lower frequencies (see FIG. 5).

This Invention and its technology may be useful for and applied to DSL and xDSL communication, as well.

Every node participating in PLC communications measures noise on the power line, attenuation and distance to the communication partner.

Here, a short description on how to measure these parameters is given:

The transmitted signal is known to all modems.

Transmitting a known signal and measuring this at the receiver side attenuation between two modems can be calculated.

Snooping on the power line wire locally at the receiver measures the noise.

With the knowledge of the transmission level, attenuation and noise the available SNR can be calculated.

Channel capabilities can be calculated for various possible communication windows of the SNR graph. E.g. possible communication windows can be found in FIG. 4 from 20 MHz to 40 MHz, 50 MHz to 60 MHz or 60 MHz to 80 MHz.

The new initiated communication shall be placed to a frequency location where the calculated channel capability fits best to the demanded transmission capability.

PLC Modems may embed a terrestrial tuner and antenna. Said modems may snoop in the air if there are any radio services and/or radio sources available. If a relevant service and/or source is found at any frequency location the respective frequency band is or shall be omitted in power line communication. Because due to radiation of the power lines there may be a loss of quality at these services if the identical frequencies are used for PLC as well.

Next the PLC modem shall measure the radiation of the power line channel where it is connected to. One modem sends a well known signal as a reference signal on the power lines channel and all participating modems receive and/or measure this signal over a wireless channel, in particular with their terrestrial antenna. With this measurement the modems determine the radiation of the power line depending on frequency. The result of this measurements shall be exchanged to all modems, so the frequencies with relevant radiation shall not be used for PLC, as well.

There are various possibilities to measure the distance between two communication partners:

Measuring transfer function in frequency domain, calculation of channel impulse response, selecting the main impulse, calculate distance with the help of signal transmission speed and the time of arrival of main impulse Measuring Impulse Response in time domain with the help of pn-sequences and calculate distance with the help of the arrival time of the main impulse and of the of signal transmission speed.

If a later starting communication decides to use the same frequency location that was already allocated by an other communication the communication of the shorter distance between the modems shall move to a second "best fit" location at a higher frequency. The communication via the longer distance shall use the spectrum at lower frequencies.

The PLT system shall implement a so called 'Distance Map' that stores the distances between all PLT modems to each other. The 'Distance Map' must be readable from all modems. Arbitration of the frequency allocation shall be done with the help of the distance map.

These and further aspects of the present invention will be further discussed in the following based of preferred embodiments of the invention by taking reference to the accompanying and schematical figures.

Figure 13:
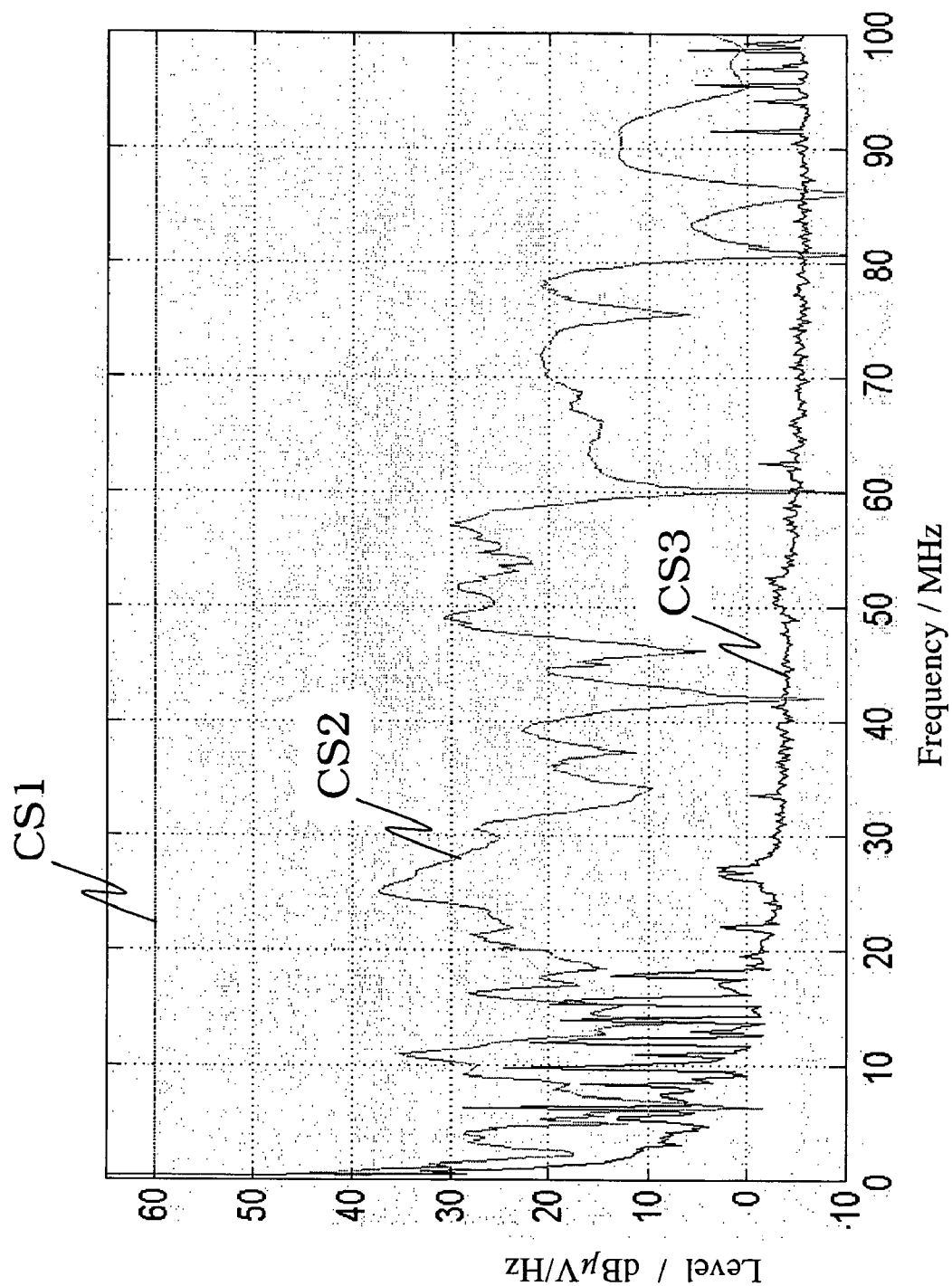
Figure 14:
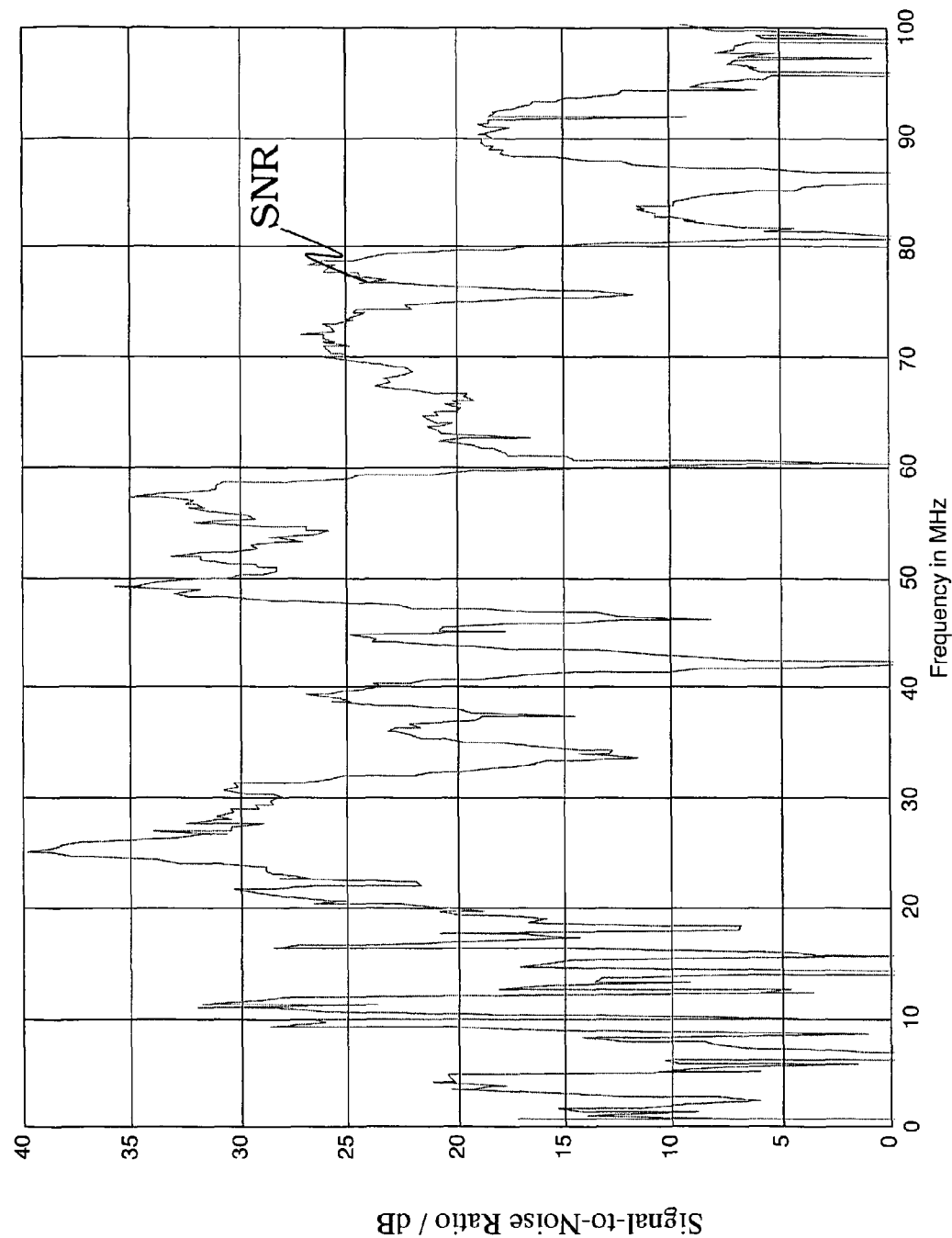
Figure 15:
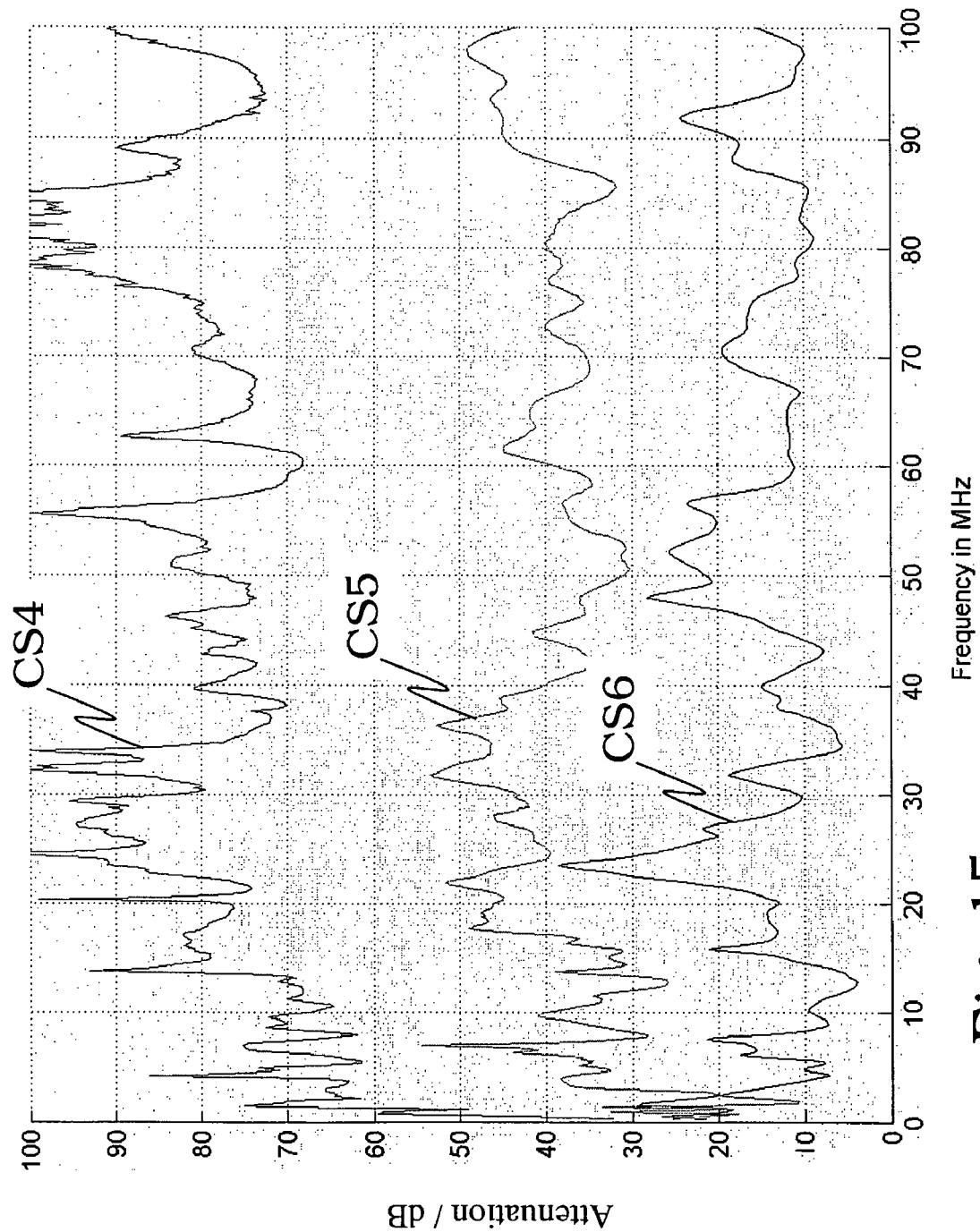

FIGS. 13-15 described by means of graphical representations of different spectra, several aspects of the present invention.

Figure 16A:
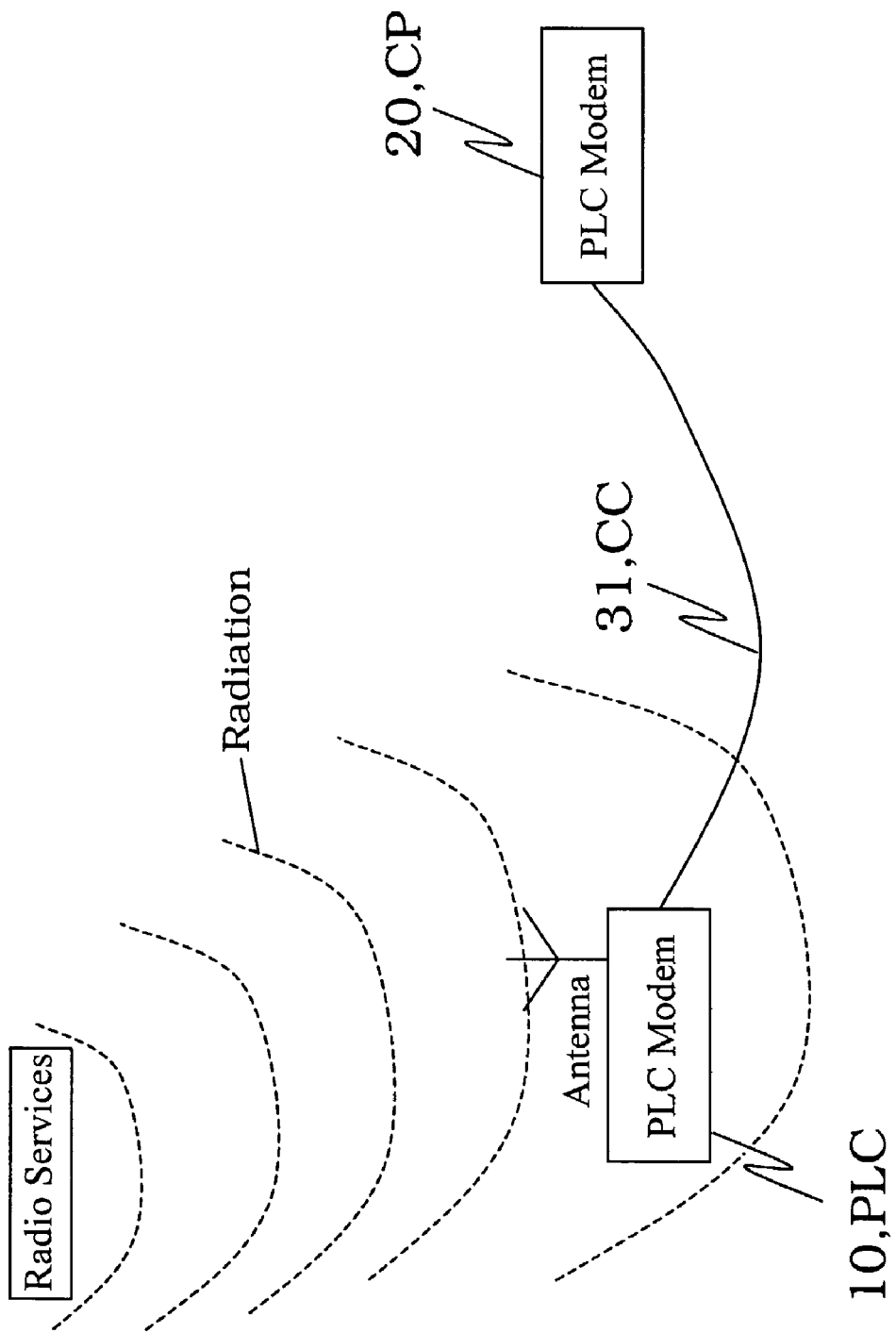
Figure 16B:
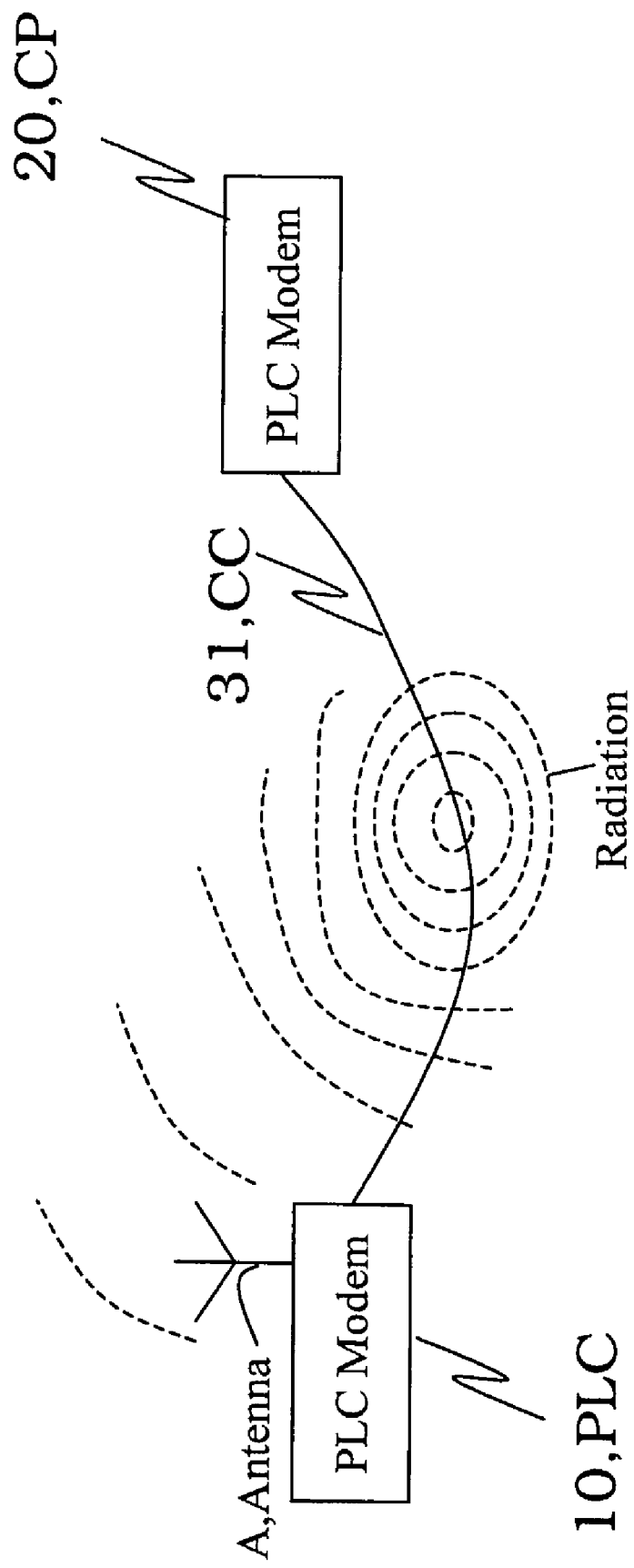

FIGS. 16A, 16B schematically describe relevant radiation situations.

Figure 17:
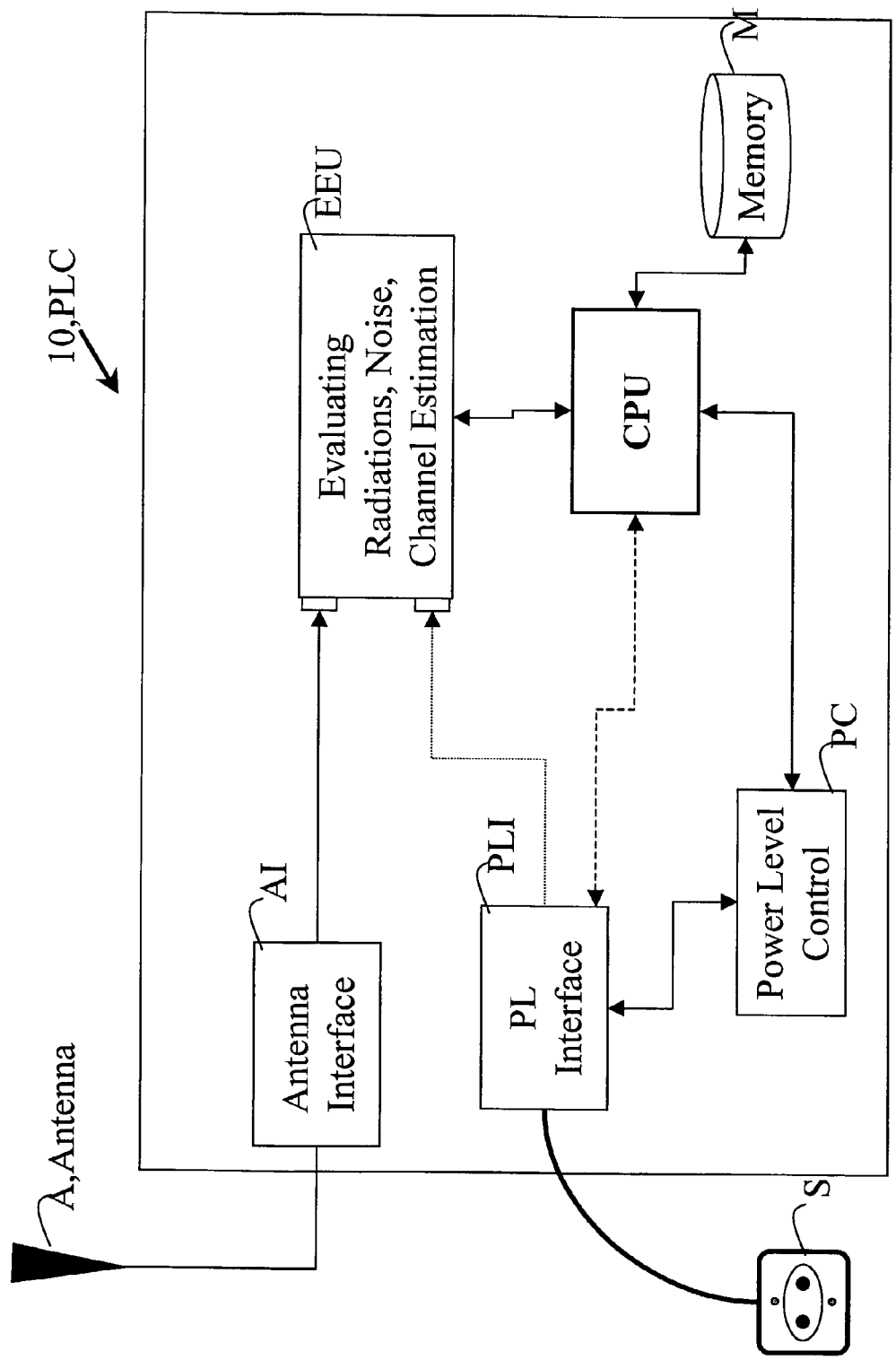

FIG. 17 demonstrates some device aspects of a PLC modem device according to the present invention are described by means of a schematical block diagram.

In the following structural and/or functional elements which are comparable, similar or equivalent with respect to each other will be denoted by identical reference symbols. Not in each case of their occurrence a detailed description will be repeated.

Figure 1:
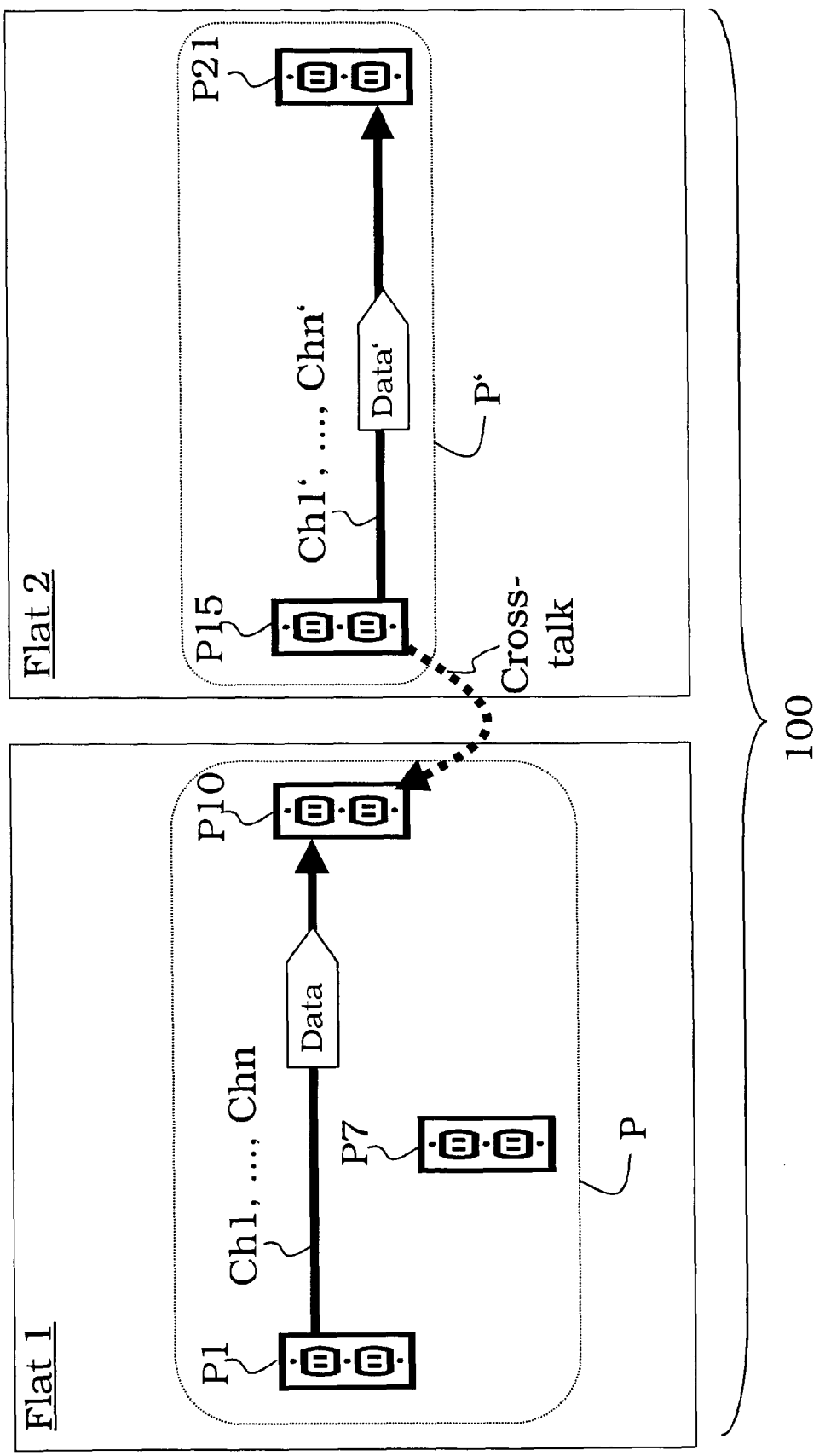
FIG. 1 is a schematical block diagram elucidating a communication environment which can be managed by the inventive method for power line communication.

FIG. 1 is a schematical block diagram elucidating a possible structure for a communication environment 100 to which an embodiment of the inventive power line communication method can be applied. Said a communication environment 100 can be referred to as a global network of devices which may by one means or another interact with each other.

The a communication environment 100 shown in FIG. 1 comprises a first power line communication system P which is situated in a first apartment of flat 1 and a second power line communication system P' which is situated in a second apartment of flat 2 which is spatially separated from said first apartment of flat 1.

The first power line communication system P comprises in the example shown in FIG. 1 three power line communication partner devices P1, P7, and P10. Between power line communication partner device P1 and power line communication partner device P10 a power line communication shall be established or is in progress which is indicated by the arrow pointing from the first or sending power line communication partner device P1 to the second or receiving power line communication partner device P10.

As on the other hand within the second power line communication system P' a communication between a sending power line communication partner device P15 and a receiving power line communication partner device P21 is in progress or shall be maintained which is indicated by the arrow pointing from power line communication partner device P15 to power line communication partner device P21 and interference or crossed for process or effect which is indicated by the doted arrow may take place by the sending power line communication partner device P15 of the second power line communication system P' to the receiving power line communication partner device P10 of the first power line communication system P.

The inventive method for power line communication is established in order to avoid the draw backs of cross-talk and interference in power line communication systems as shown in FIG. 1.

Figure 2:
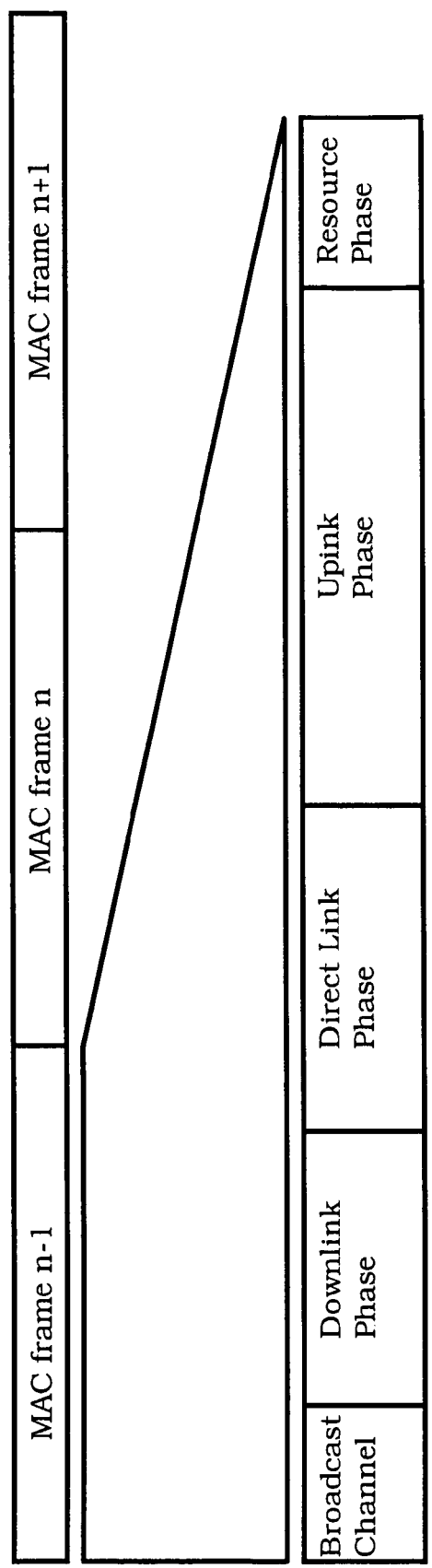
FIG. 2 is a schematical block diagram elucidating a typical MAC structure.
Figure 3:
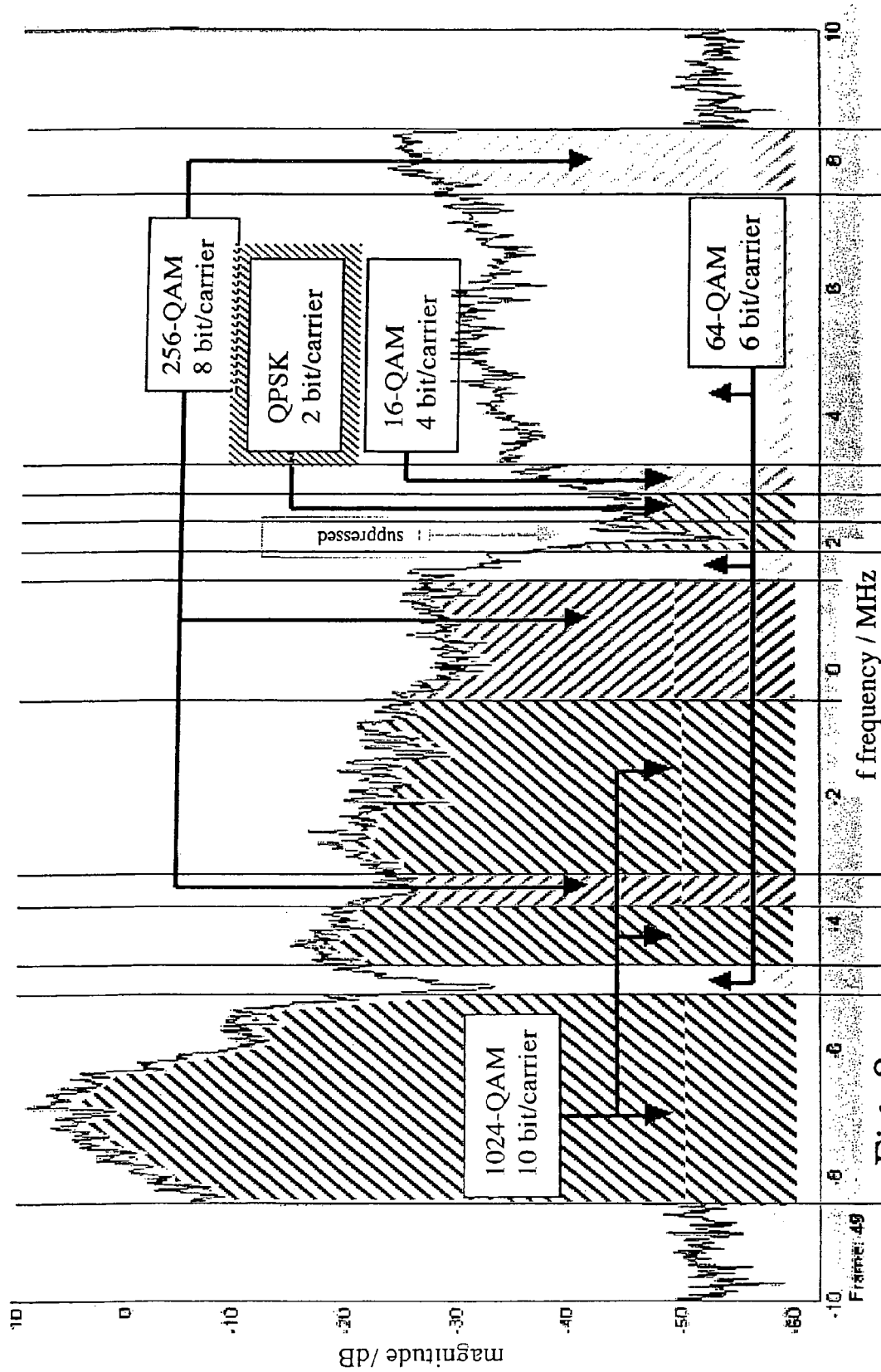
FIG. 3 is a diagram elucidating a possible signal-to-noise-ratio SNR in a power line communication channel and the selection of the constellation for each carrier.

FIG. 2 is a schematical block diagram of a MAC frame structure according to which power line communication between a first or sending power line communication partner device P1 and a second or receiving power line communication partner device P10 as shown in FIG. 1 can be realized. According to FIG. 2 the data to be communicated between interacting power line communication partner devices P1, P10 are transmitted within the structure of so-called MAC frames or media access control frames as shown in FIG. 2. The data is distributed within a concatenation of MAC frames, each of which are composed of five major sections, namely the broadcast channel section, a downlink face section, a direct link face section, an uplink face section, as well as a resource face section.

Figure 4:
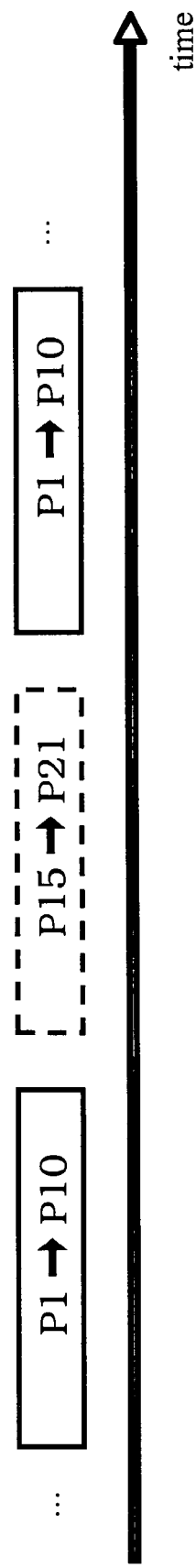
FIG. 4 is a schematical block diagram elucidating the time structure according to which the communication within a system of FIG. 1 can be established for TD coexistence approach aspects.

FIG. 4 is a schematical block diagram elucidating communication between power line communication partner devices P1, P10 on the one hand and P15, P21 on the other hand. The blocks with solid lines indicate data communication between the first or sending power line communication partner device P1 and the second or receiving power line communication partner device P10 of the first power line communication system P, whereas the dashed block indicates the data communication between the sending power line communication partner device P15 and the receiving power line communication partner device P21 of the second power line communication system P'. Each of the blocks correspond to respective time slots which are assigned to the respective pairs of power line communication partner devices P1, P10 and P15, P21 of said first and said second power line communication systems P, P' respectively, in order to avoid interference and cross-talk problems between said first and second system P, P'.

FIGS. 5 to 8 elucidate by means of graphical representations the transmission and receiving situations in said first and second power line communication systems P, P' shown in FIG. 1.

Figure 5:
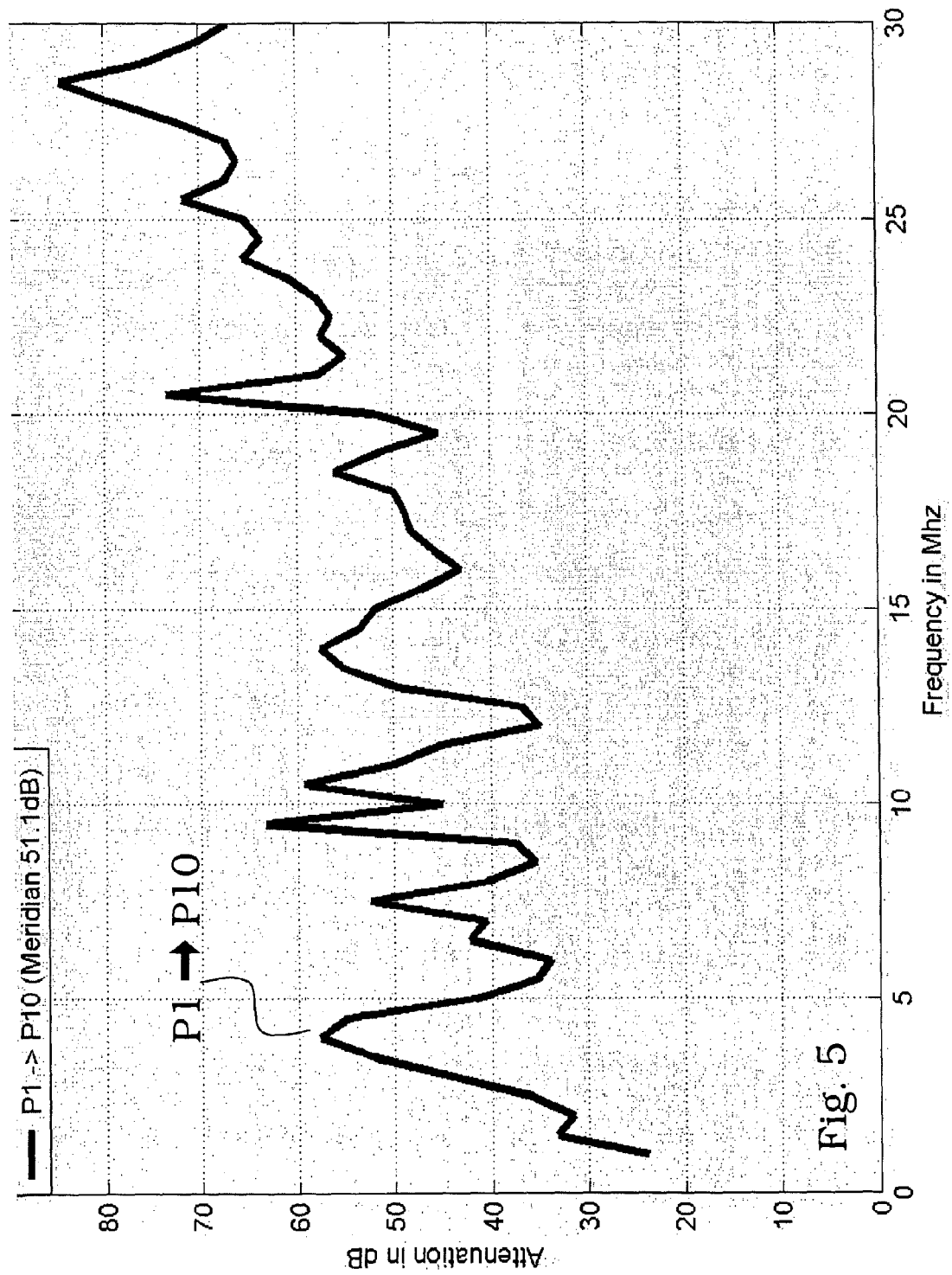
FIG. 5-8 are schematical graphical representations for elucidating aspects of communication conditions in a process of power line communication for FD coexistence approach aspects.

FIG. 5 elucidates the attenuation of a signal which is transmitted from said first or sending power line communication partner device P1 of said first power line communication system P to said second or receiving power line communication partner device P10 of said first power line communication system P. The trace of FIG. 5 describes the attenuation in dB as a function of frequency of the transmitted signal. Here the attenuation is measured at the location of the second power line communication partner device P10 of said first power line communication system P.

Figure 6:
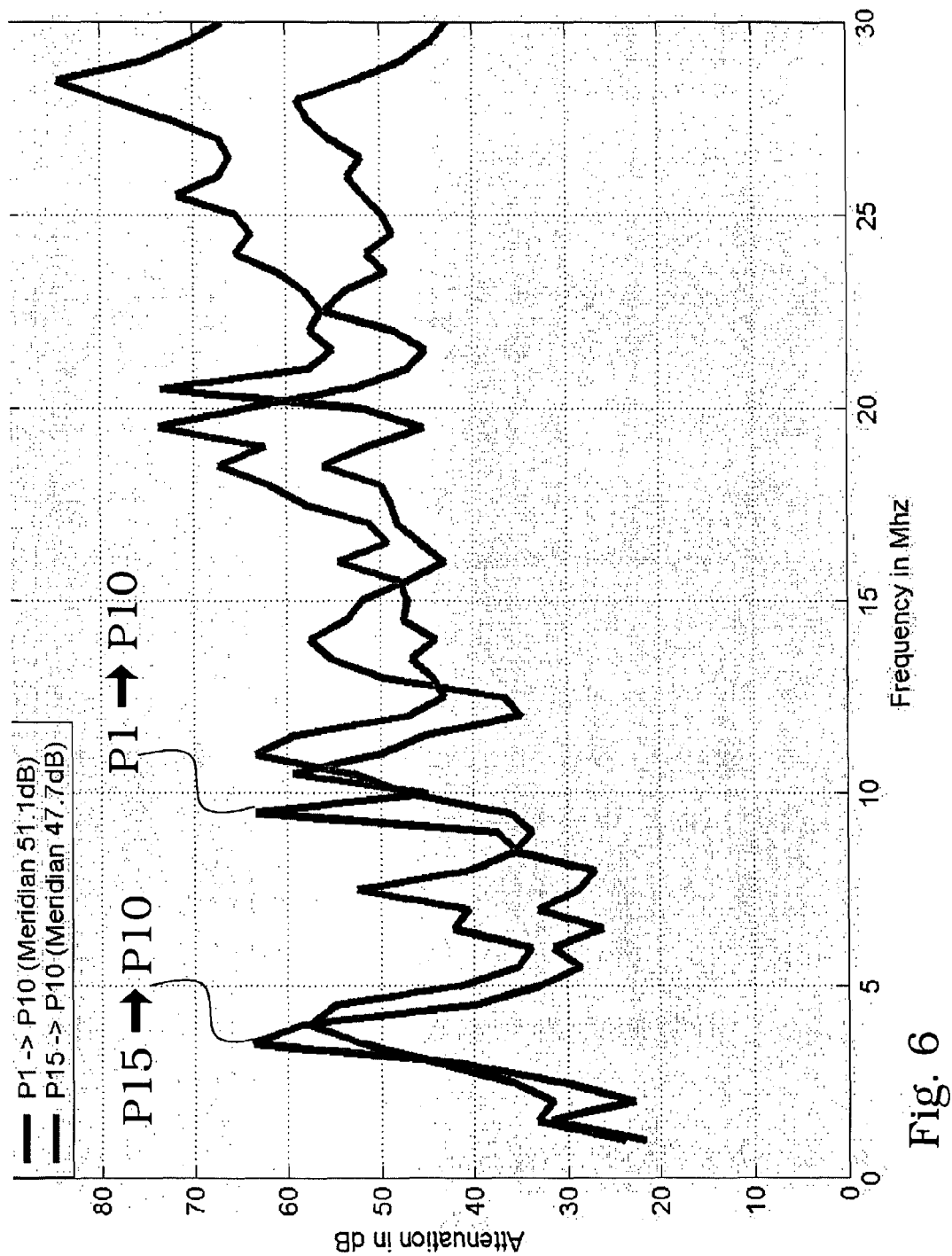

FIG. 6 includes as a additional trace the attenuation of a signal transmitted from the sending power line communication partner device P15 of the second power line communication system P' at the location of the second or receiving power line communication partner device P10 of the first power line communication system P. Obviously, there exist frequency bands in which the signal emitted from the sending power line communication partner device P15 of the second power line communication system P' is less attenuated at the location of the second or receiving power line communication partner device P10 of the first power line communication system P when compared to the attenuation of the signal emitted from the first or sending power line communication partner device P1 of said first power line communication system P. Therefore, there exists sections in the frequency spectrum where the interference or cross-talk signal has a superior signal strength over the data signal to be received by said second or receiving power line communication partner device P10 of the first power line communication system P.

Figure 7:
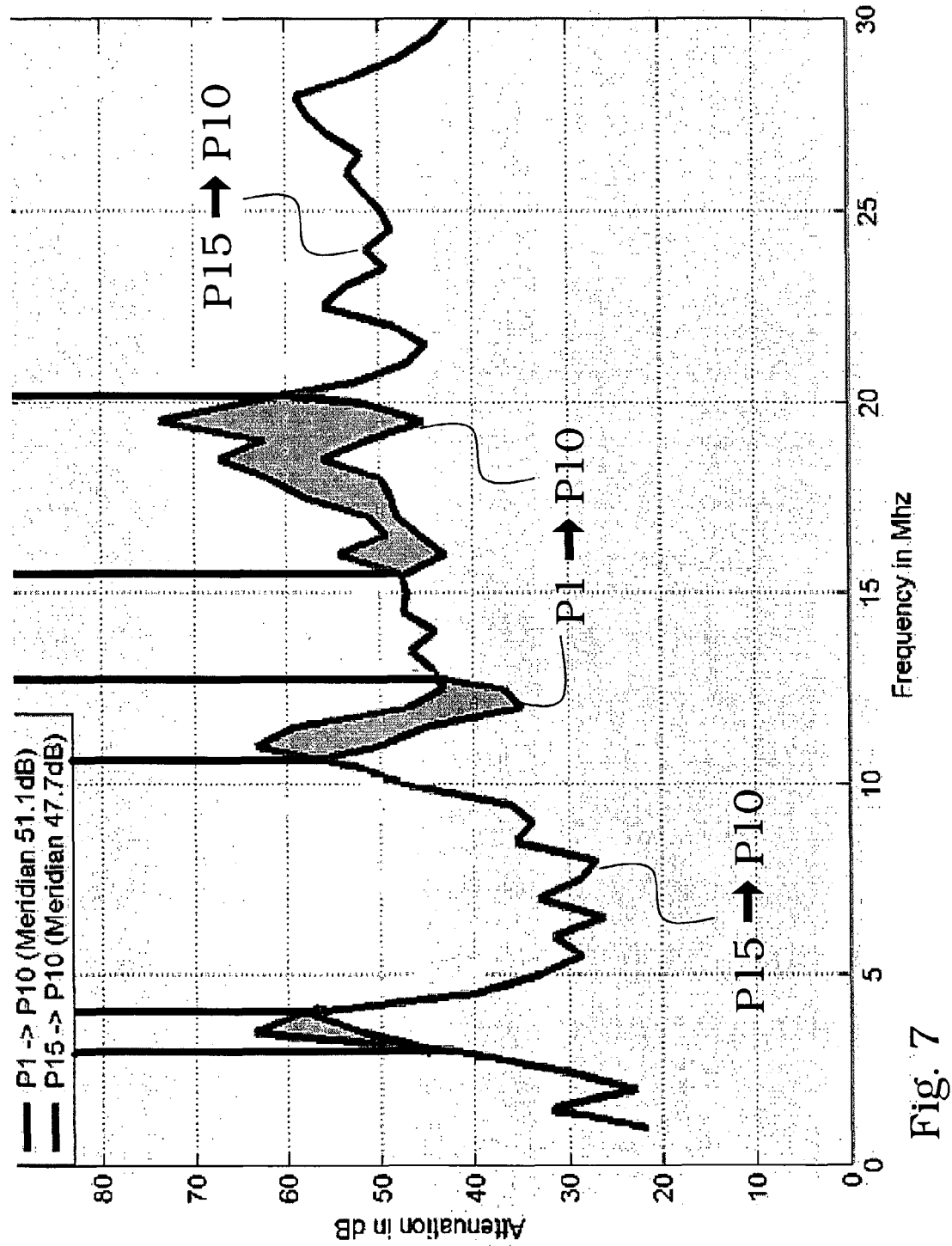

In FIG. 7 the frequency bands are emphasized and indicated at which the latter described situation is not given, i.e. the scattered sections are frequency sections at which the signal strength for the data signal transmitted from first or sending power line communication partner device P1 is larger than the signal interfered from the sending power line communication partner device P15 of the second power line communication system P' at the location of the second or receiving power line communication partner device P10 of said first power line communication system P.

Figure 8:
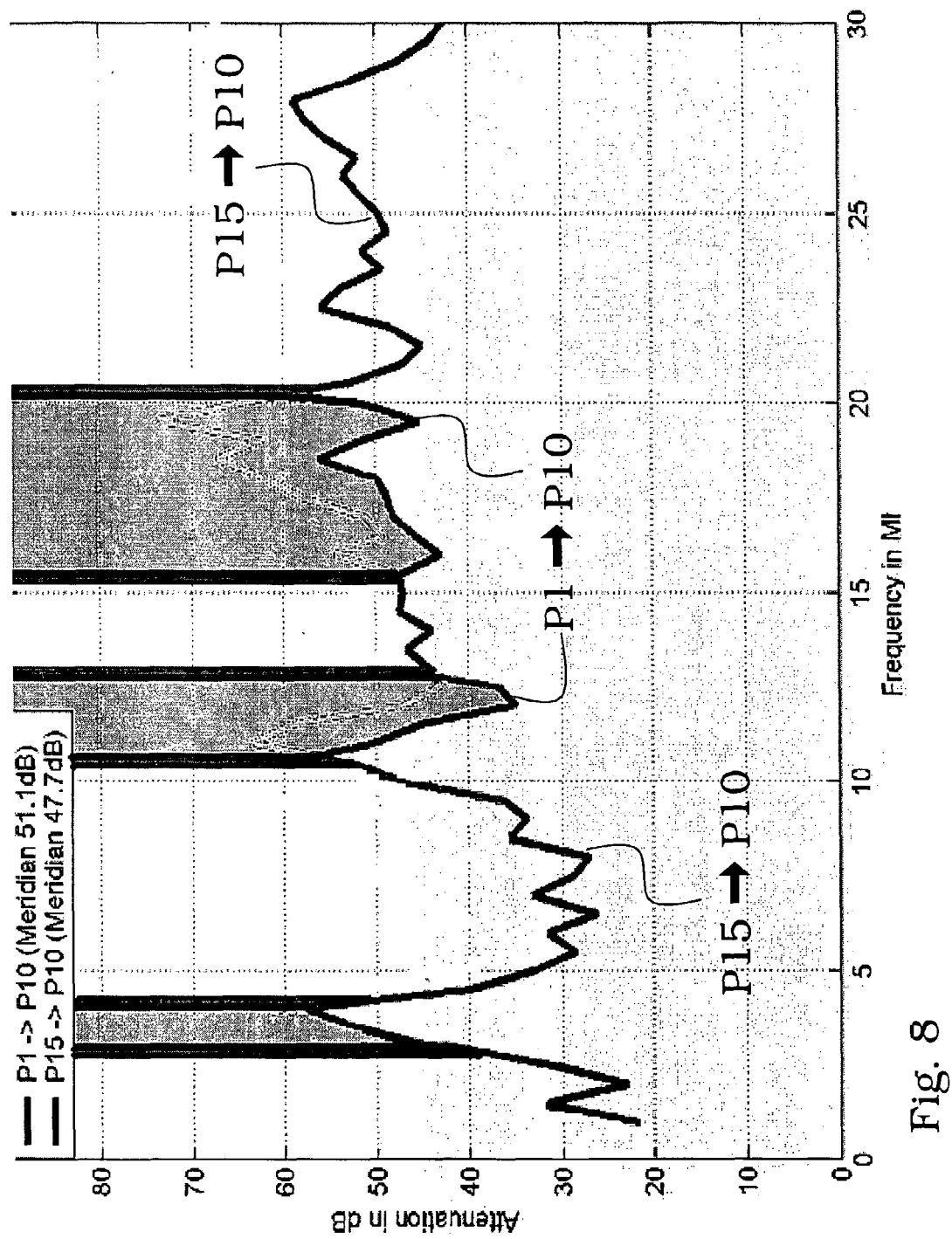
Figure 9:
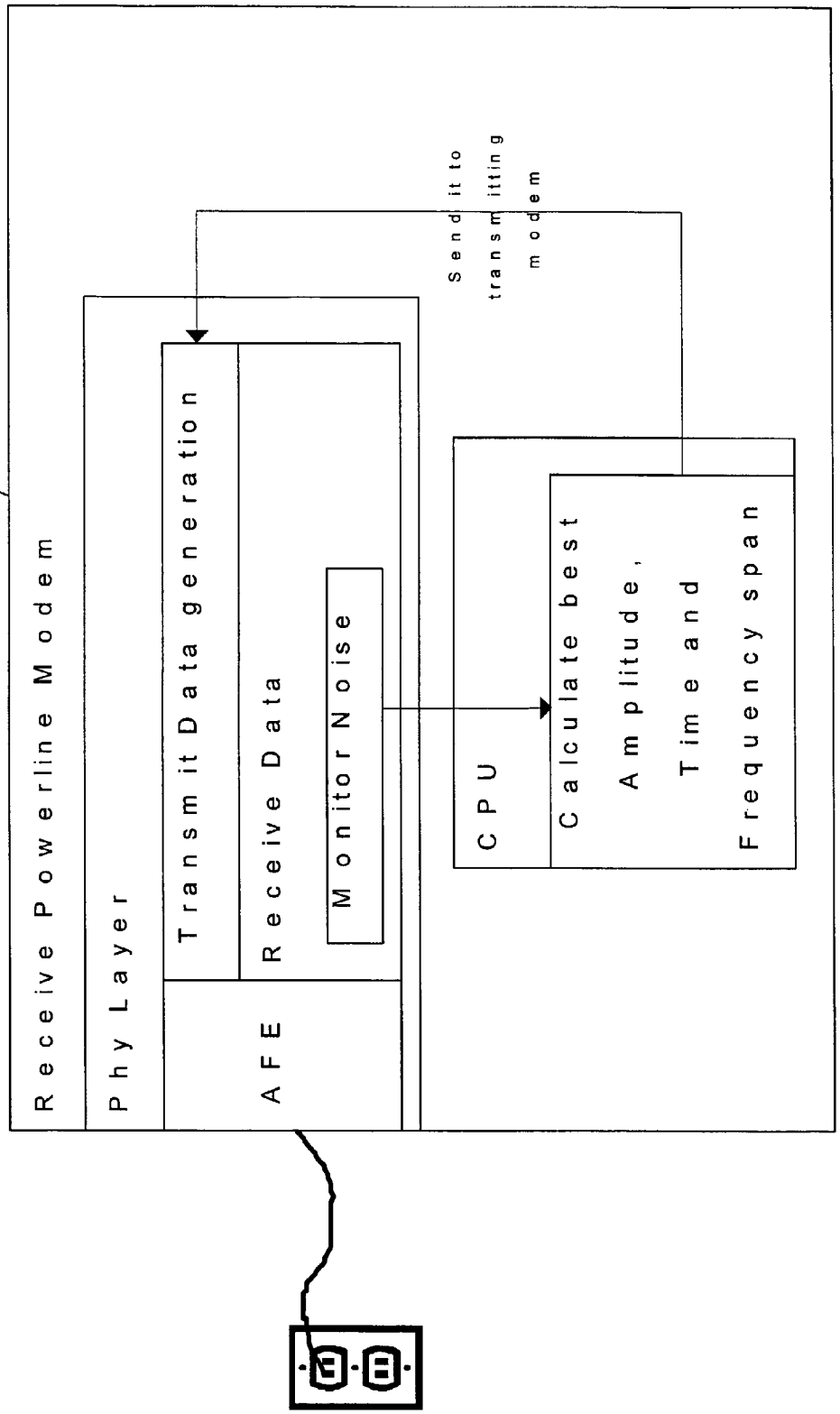
FIG. 9 is a schematical block diagram elucidating an embodiment of a receiving power line communication partner device.
Figure 10:
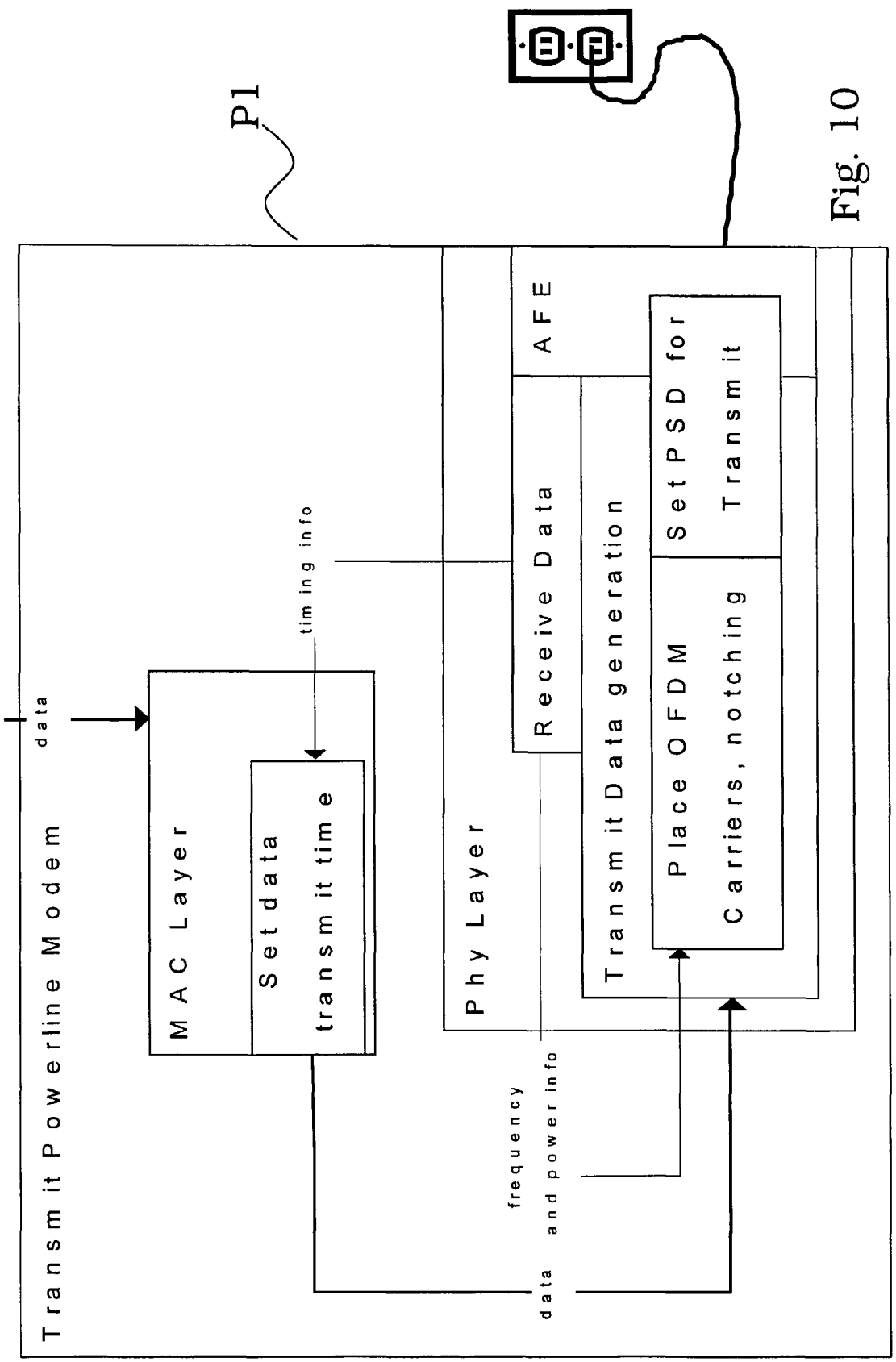
FIG. 10 is a schematical block diagram elucidating an embodiment of a sending or transmitting power line communication partner device.

FIG. 8 elucidates a situation in which the emphasized sections shown in FIG. 7 are freed from emissions of the sending power line communication partner device P15 of the second power line communication system P' in order to increase the signal-to-noise ratio at the respective frequency bands for the data signal transmission from said first or sending power line communication partner device P1 to said second or receiving power line communication partner device P10 of said first power line communication system P thereby increasing the possible communication band width and data throughput.

These and further aspect will also be become more clear based on the following description:

In the following elements and structures which are equivalent or comparable with respect to their function and/or the structure will be indicated by the same reference symbols and their explicit description will not be repeated in each case of their occurrence.

Figure 11:
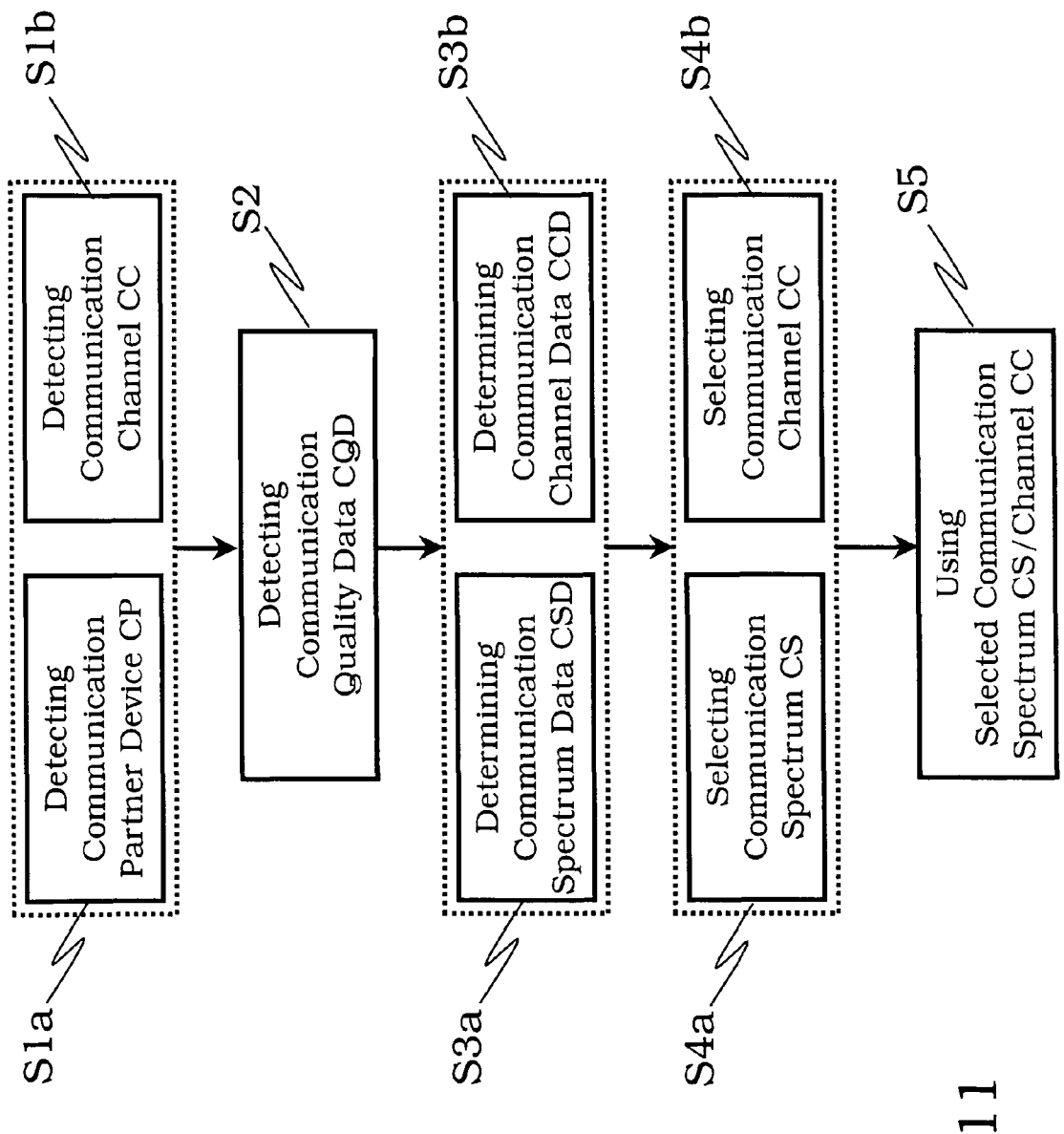
FIG. 11, 11A, 11B is a schematical block diagram elucidating a preferred embodiment of the inventive method for operating a PLC modem device.

FIG. 11 is a schematical block diagram containing a flow chart for a preferred embodiment of the inventive method for operating a PLC modem device according to the present invention.

Dearing a first section a step S1$a$ of detecting communication partner devices CP and additionally or alternative a step S1$b$ of detecting communication channels CC are performed. These both steps S1$a$ and S1$b$ may be alternatives, however, they may be also performed both. Thereby information with respect to possible communication partner devices CP and/or possible communication channels CC with respect to said communication partner devices CP can be obtained.

In a following step S2 of a following section of the inventive method for operating a PLC modem device communication quality data CQD are determined, detected and/or derived on the basis of the information obtained from steps S1$a$ and S1$b$. This step S2 of detecting communication quality data CQD may comprise detecting processes or measuring processes with respect to signal attenuation, signal transmission level, noise, and/or signal-to-noise-ratio.

In a following section of the inventive method for operating a PLC modem device a step S3$a$ of determining communication spectrum data CSD and/or a step S3$b$ of determining communication channel data CCD are performed. Both steps S3$a$ and S3$b$ may be performed alternatively or both so as to derive information which is descriptive for the spectra which might be used for future communication processes and/or information with respect to possible applicable communication channels.

Based on the determined communication spectrum data CSD and the communication channel data CCD in a following section a communication spectrum CS and/or a communication channel CC may be selected among the possible communication spectra and/or among the possible communication channels, respectively, by performing respective processing steps S4$a$ and S4$b$, respectively.

Finally, in a final step S5 the selected communication spectrum CS and/or the respective selected communication channel CC are used for establishing a communication between said PLC modem device and a selected or given communication partner device CP.

Figure 11A:
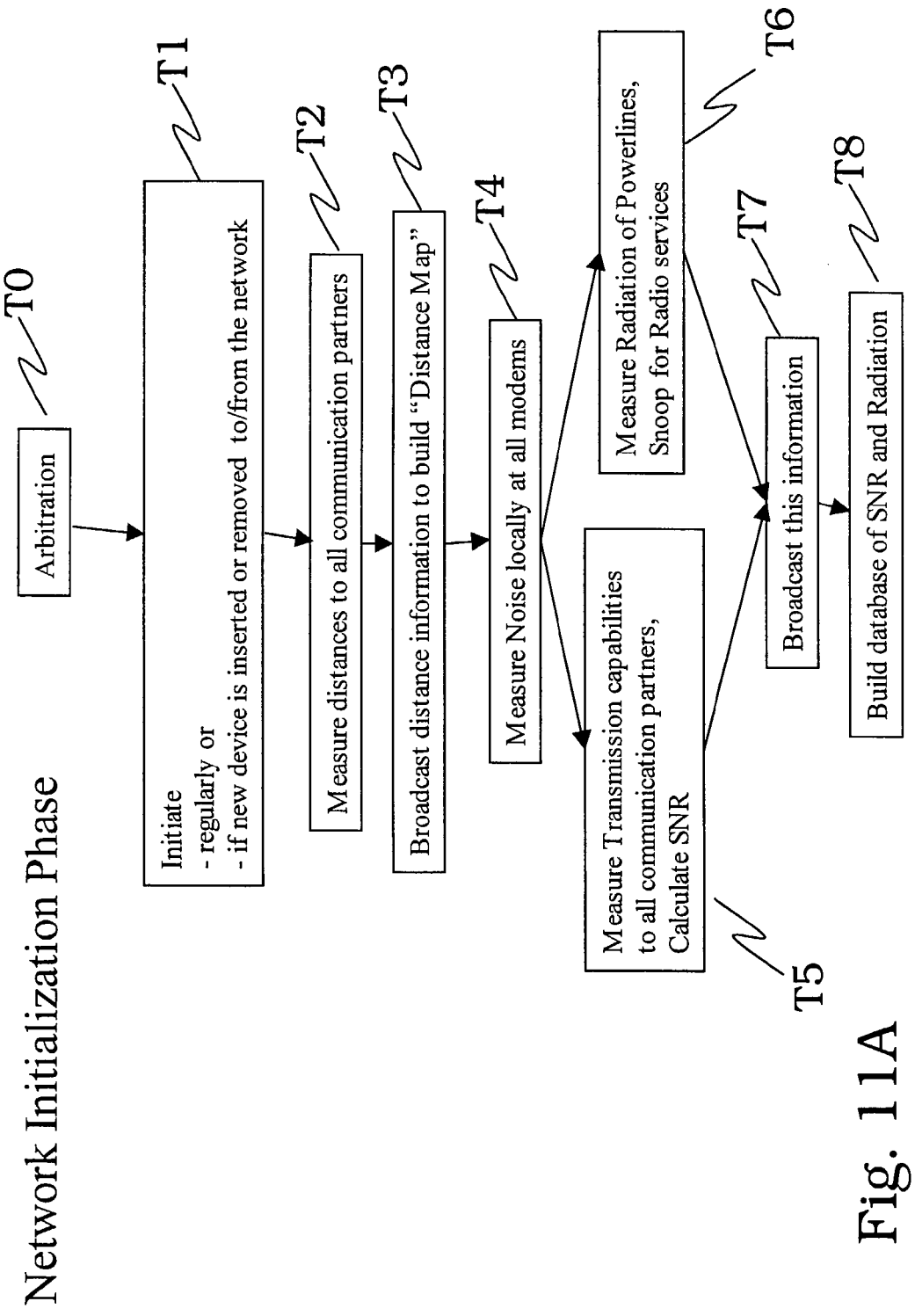
Figure 11B:
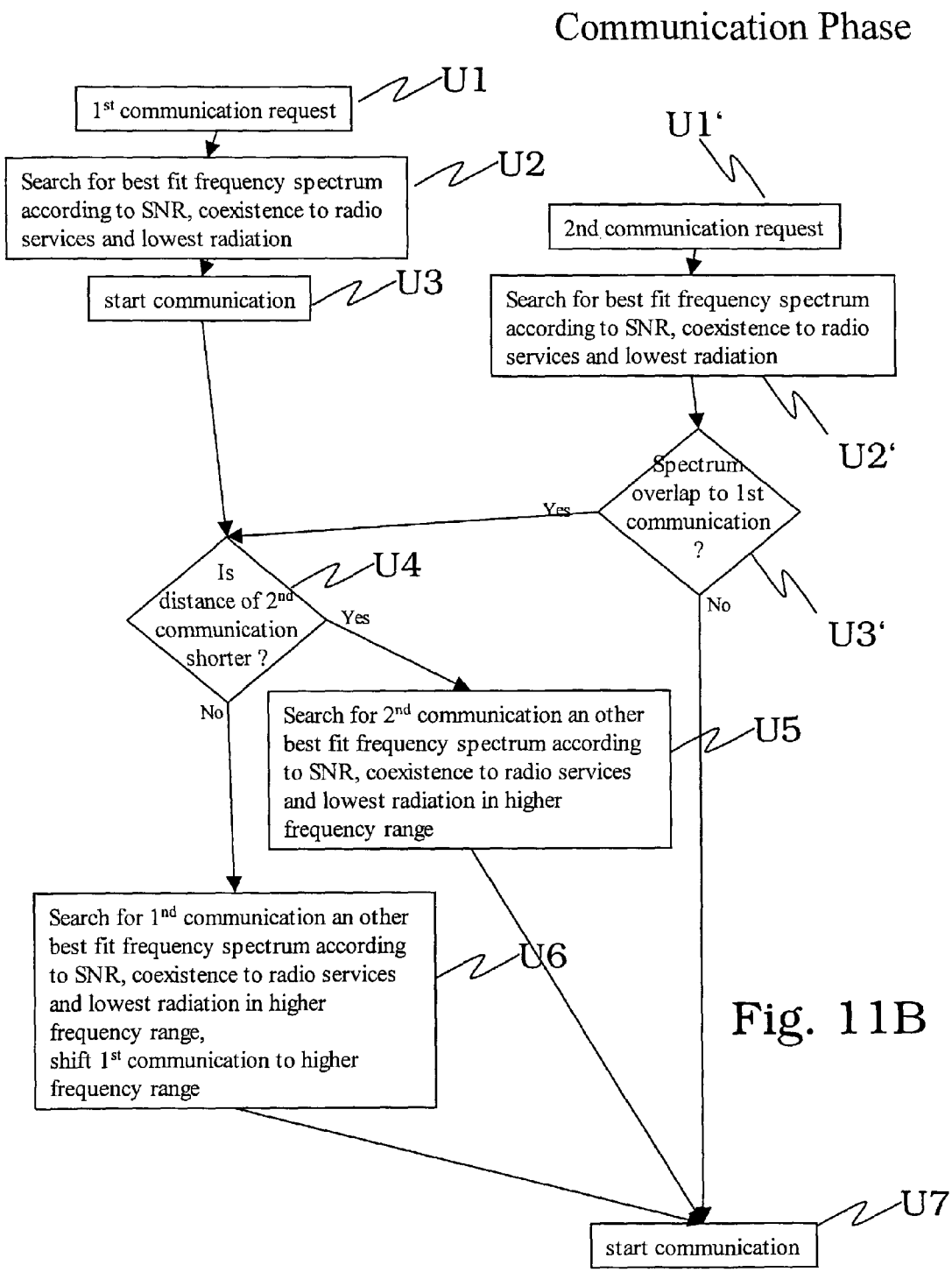

FIGS. 11A and 11B show in more detail sub-process of general scheme shown in FIG. 11, in particular a sub-process during a network initialization phase and a sub-process during a network communication phase, respectively. The respective steps T0 to T8 and U1 to U7 and U1' to U3' of the schemes of FIGS. 11A and 1B, respectively are essentially self-explanatory.

FIG. 11A describes a possible network initialization phase comprising a sub-process T0 of arbitration and sub-processes of measurements and evaluation T1 to T8. Finally, the respective communication quality data CQD and the like are available.

FIG. 11B describes the possible communication management of two pairs of PLC modems 10, PLC. Steps U1 to U3 describe the establishment of the communication of the first pair of PLC modems, i.e. between a first and a second PLC modem. Steps U1' and U2' described a communication pre-phase for the second pair of PLC modems, i.e. between a third and a fourth PLC modem. Steps U4 to U6 and U3' describe the negotiation between the two pairs to establish an appropriate communication structure which fits best or better.

Figure 12:
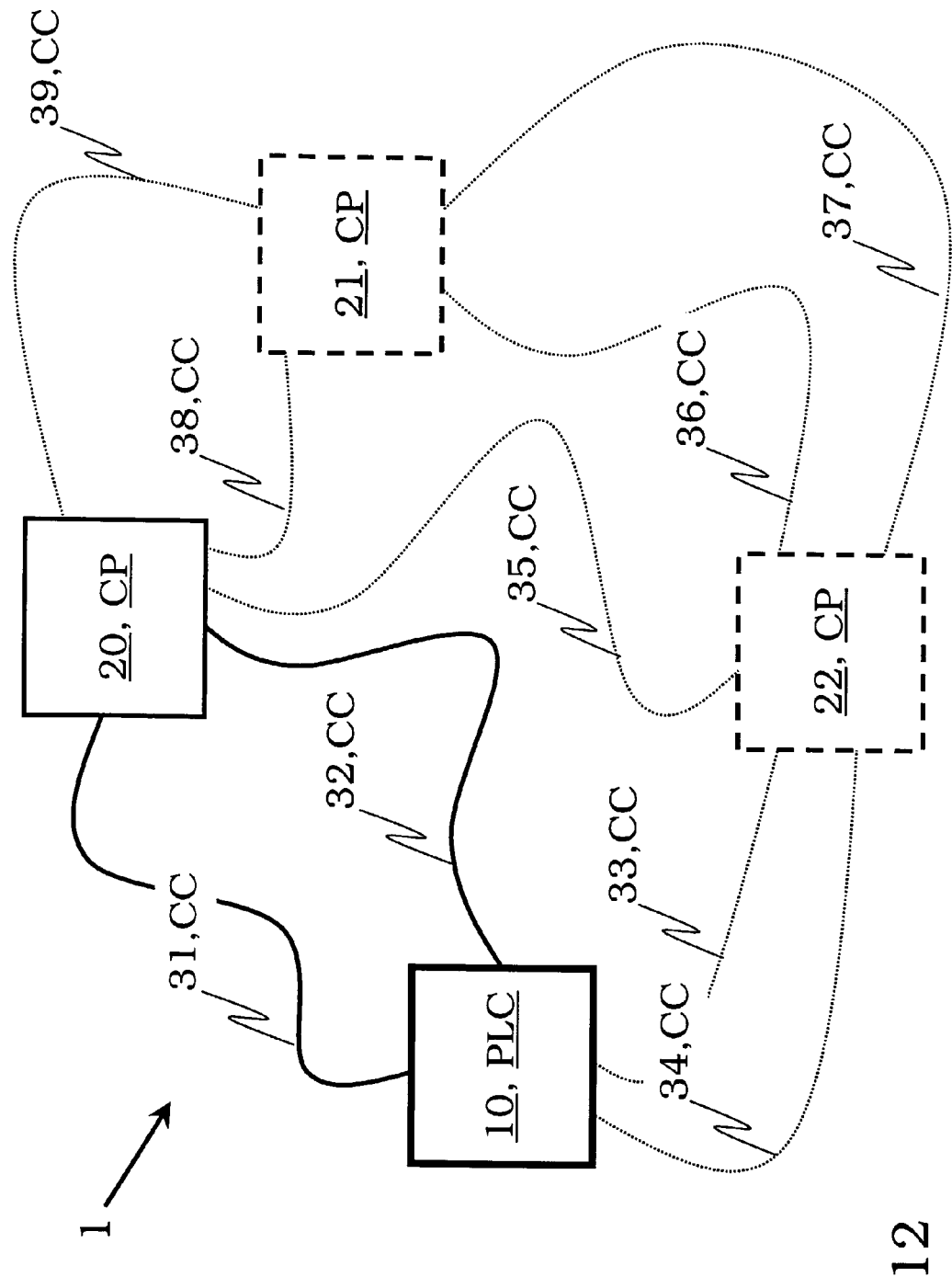
FIG. 12 is a schematical block diagram elucidating the basic aspects of the inventive method for operating a PLC modem device and of an inventive communication arrangement.

FIG. 12 demonstrates by means of a schematical block diagram a communication arrangement 1 or communication network 1 to which the inventive method for operating a PLC modem device or for operating a communication arrangement/network may be applied to.

The communication network 1 or communication arrangement 1 of FIG. 12 comprises a power line carrier modem device or PLC modem device 10, PLC. Additionally said arrangement or network 1 further comprises possible communication partner devices 20, 21, 22, CP. In the case of the embodiment of FIG. 12 the PLC modem device 10, PLC is connected to said communication partner device 20, CP by communication channels 31, 32, CC. For respective connections between and to the other communication partner devices 21, 22 further communication channels 33-39, CC are provided.

When applying the inventive method for operating the PLC modem device 10, PLC it may first be checked which communication channels are available for communicating to the appropriate communication partner device 20, CP. After the respective communication channels 31 und 32 are found respective communication quality data CQD are collected and evaluated on the basis of which respective communication spectrum data CSD as well as communication channel data CCD are derived. Based on the derived communication spectrum data CSD and communication channel data CCD for a next communication to be established between said PLC modem device 10 and the respective communication partner device 20 a respective channel and a respective spectrum for the communication are selected.

The selection is realized to establish a communication which fits best to the communication, spectrum and channel capabilities of the communication arrangement or communication network 1 at the actual and present status.

According to preferred embodiments of the inventive method for operating a communication arrangement or a communication network 1 every node and therefore every PLC modem device is enabled to measure the noise on the respective power line, the attenuation of the signal and the distance to the respective communication partner devices. FIG. 13 demonstrates different measurement results which might occur during the process of operation and during the process of communication.

FIG. 13 is a graphical representation of the signal level as a function of the frequency of the signal. Trace CS1 demonstrates the transmitted signal or reference signal which is known to all nodes participating in the PLC communication process. The trace indicated by CS2 represents the received signal after transmission and shows a respective and transmission dependent damping with respect to the original signal CS1. Finally, the trace indicated by CS3 demonstrates the local noise obtained during a respective transmission process. As the transmitted signal is known to all nodes and therefore known to all participating PLC modem devices and the transmitted version of the known signal can be measured at the receiving side or receiver side, the respective attenuation between two participating devices, i.e. the sending PLC modem device and a receiving communication partner device CP or vice versa can be calculated. Therefore, by snooping on the power line wire locally the noise at the receiver side can be measured. With the knowledge of the transmission level, the attenuation of the signal and the noise, the available signal-to-noise-ratio can be calculated.

FIG. 14 is a spectral representation of the signal-to-noise-ratio SNR.

The signal to noise ratio SNR may be calculated by using Shannons law according to equation (3) above, which reads in this case:

$$SNR := P\text{transmit}_{[dB\mu V]} - \text{Attenuation}_{[dB]} - \text{Noise}[dB].$$

In the case of the situation shown in FIGS. 13 and 14 this leads to $$SNR := CS2 - CS3, \text{ with } P\text{transmit}_{[dB\mu V]} = CS1.$$

The respective channel capability C is then $$C := \int_{f_{Start}}^{f_{Stop}} ld(1 - SNR(f)) df.$$

with $f_{Start}$ and $f_{Stop}$ denoting the frequency band's boundaries for the required bandwidth Bw:

$$Bw := f_{Stop} - f_{Start}.$$

In FIG. 14 one can ranges with comparable high values for SNR from 20 MHz to 40 MHz, from 50 MHz to 60 MHz, as well as from 60 MHz to 80 MHz.

FIG. 15 is a spectral representation of the signal attenuation along a communication channel so as to demonstrate the attenuation level as a function of the distance between two communicating devices. In FIG. 15 the trace indicated by CS4 shows the attenuation of the transmitted signal for a long distance channel. The trace indicated by CS5 demonstrates the attenuation level of a medium distance channel. Finally, the trace indicated by CS6 demonstrates the attenuation level from a short distance communication channel.

FIGS. 16A and 16B demonstrate schematically the radiation situations the present invention can deal with.

In the situation shown in FIG. 16A the PLC modem device 10, PLC snoops in the air in order to detect external radio services or radio sources of relevance. When establishing communication to the communication partner device 20, CP via a communication channel 31, CC which is a power line channel the frequencies or spectral ranges of the external radio sources or radio services are avoided or not used in order to avoid interferences to the external radio sources or radio services via radiation coming from the power line and the communication process between the modem devices 10 and 20 and/or from said external radio sources or radio services coming from said external radio sources or radio services via said power line channel 31, CC.

In the situation shown in FIG. 16B the PLC modem device 10, PLC snoops in the air in order to detect radiation from the power line channel 31, CC itself.

In FIG. 17 some device aspects of a PLC modem device 10, PLC according to the present invention are described by means of a schematical block diagram.

Power line communication is realized by connecting said PLC modem device 10, PLC via a power line interface PLI to e.g. a socket of a power line system. transmitted and received data are composed and analyzed, respectively, by a provided CPU and an evaluating and estimating unit EEU. In addition, an antenna A together with an antenna interface AI are provided in order to wirelessly receive signals with respect to certain communication channels 31, 32, CC and/or communication spectra CS. By means of the evaluating and estimating unit EEU radiation, noise, interferences, and channel quality can be estimated. In order to ensure high PLC quality communication spectra CS and/or communication channels 31, 32, CC may be changed and/or the transmission conditions, e.g. the transmission power, may be adapted, with or without changing communication spectra CS and/or communication channels 31, 32, CC.

Power control unit PC is adapted in order to adjust the power level for PLC transmission and for realizing the power back off and QoS concepts.

In the sense of the present invention the above and below listed features may be arbitrarily combined.

| Reference Symbols | |
|---|---|
| 100 | communication environment |
| Ch1, ..., Chn | Possible communication channels in 1$^{st}$ PLC system P |
| Ch1', ..., Chn' | Possible communication channels in 2$^{nd}$ PLC system P' |
| P | first power line communication system |
| P' | second power line communication system |
| P1 | first or sending power line communication partner device |
| P7 | power line communication partner device |
| P10 | second or receiving power line communication partner device |
| P15 | sending power line communication partner device |
| P21 | receiving power line communication partner device |
| 1 | communication arrangement, communication network according to the present invention |
| 10 | PLC modem device, PLC modem |
| 20 | communication partner device |
| 21 | communication partner device |
| 22 | communication partner device |
| 31-39 | communication channel |
| CC | communication channel |
| CCD | communication channel data |
| CP | communication partner device |
| CQD | communication quality data |
| CSD | communication spectrum data |
| CS | communication spectrum |
| PLC | PLC modem device, PLC modem |
| A | Antenna, antenna device |
| AI | Antenna interface |
| CPU | Central Processing Unit, Processor |
| EEU | Estimation and Evaluation Unit |
| M | Memory |
| PC | Power Control, Power Level Control |
| PLI | Power line Interface |
| S | Socket, PLC socket, PLC connection means |

The invention claimed is:

1. A method for operating a communication arrangement including a plurality of PLC modem devices, comprising:
   for each of said PLC modem devices:
      a presence of interferences caused by operating other PLC modem devices, caused by a communication line used for own power line communication and/or from operating radio services, is monitored, and
      in the case that interferences from said operating other PLC modem devices, from said communication line used for own power line communication and/or from said operating radio services, are detected, power line communication is at most or essentially performed on communication channels or communication spectra where said interferences from other PLC modem devices or from radio services are not detected,
      thereby simultaneously avoiding interferences to and from other PLC modem devices and radio services,
   wherein a pre-defined reference signal is generated by at least one PLC modem device and transmitted via at least one available communication channel,
   wherein possible communication partner devices measure said pre-defined reference signal via channels other than said available communication channels and/or analyze the respective measurement data,
   wherein based on said measurements said communication quality data, said communication spectrum data, said communication channel data, said communication spectrum and/or said communication channel are chosen or selected,
   thereby by fair avoidance avoiding and de-allocating at least one of communication spectra and communication channels associated with at least one of amateur AM and DRM radio services.

2. A method according to claim 1,
   wherein said PLC modem device measures the radiation of the power line channel to which it is connected,
   wherein one modem device sends a well known signal as a reference signal on the power lines channels and all participating modems receive and/or measure this signal over a wireless channel,
   wherein with this measurement the modem devices determine the radiation of the power line channel depending on frequency, and
   wherein the result of the measurements is exchanged to all modem devices to not use or to avoid the frequencies or spectral ranges with respect to the relevant radiation for PLC communication.

3. A method according to claim 2,
   wherein all participating modems are provided with a terrestrial antenna, and wherein all participating modems receive and/or measure this signal with their terrestrial antenna.

4. A method for operating a PLC modem device in a communication arrangement according to claim 1, comprising:
   at least one of generating and providing communication quality data with respect to at leas one communication channel between said PLC modem device and at least one communication partner device, said communication quality data being descriptive for at least one of communication capabilities, communication quality and communication features of at least one of said at least one communication partner device and said at least one communication channel,
   determining at least one of communication spectrum data and communication channel data based on said communication quality data and being descriptive for at least one of at least one communication spectrum for said PLC modem device and for said at least one communication channel each of which with respect to said at least one communication partner device,
   at least one of determining and selecting at least one of a communication spectrum and a communication channel from said at least one communication channel each of which is based on at least one of said communication spectrum data and on said communication channel data, and
   communicating with said at least one communication partner device via at least one of said selected communication channel and said selected communication spectrum,
   wherein by a measurement process at least one of possible communication channels and communication spectra are monitored within said at least one of generating and providing said communication quality data, and
   wherein in said at least one of determining and selecting at least one of a communication spectrum and a communication channel at least one of an actual communication spectrum and an actual communication channel is selected and chosen for said communicating for which a comparable low interference from signal sources or signals other than the communication partner devices associated in said communicating and the signal stemming there from, respectively, is given,
   thereby avoiding and de-allocating partly or completely at least one of communication spectra and communication channels of devices and services other than devices and services associated in said step of communication, and
   thereby avoiding and de-allocating partly or completely at least one of communication spectra and communication channels associated with one or a plurality of amateur, AM or radio services.

5. A method according to claim 1, wherein said measurement process is performed wirelessly.

6. A method according to aim 1,
wherein said measurement process is performed by an antenna as a part of said PLC modem device.

7. A method according to claim 1,
wherein said measurement process is performed by wire.

8. A method according to claim 1,
wherein said measurement process is performed by a sensor connected to a respective communication wire.

9. A method according to claim 1,
wherein said actual communication conditions are chosen to effect and select at least one of the group comprising a frequency band, a signal modulation scheme, a time slot, a transmission power, a transmission gain, and a reception gain each of a possible or of said actual communication channel of the plurality of possible communication channels between said at least one first or sending power line communication partner device and said at least one second or receiving power line communication partner device.

10. A method according to claim 1,
further comprising a power back off process to avoid interference with other power line communication services and/or radio services by reducing transmission power fed or to be fed.

11. A method according to claim 10,
wherein in said power back off process transmission power fed or to be fed is reduced to a minimum value or range which is determined beforehand to be still sufficient and/or appropriate for enabling and/or maintaining loss free or essentially loss free power line communication.

12. A method according to claim 10,
wherein said power back off process is performed individually for one or a plurality of different channels and/or carriers, 13. A method according to claim 10,
wherein said power back off process is performed on a distinct channel and/or carrier if an actual signal to noise ratio of said given channel and/or carrier is better than a signal to noise ratio necessary for an actual bit loading in said given channel and/or carrier.

14. A method according to claim 1,
wherein power line communication is performed with a transmission gain and/or transmission power on the transmission side which fits to at least one of a maximum sensitivity, maximum input gain, and minimum input attenuation on a receiving side.

15. A method according to claim 14,
wherein said transmission gain and/or transmission power of said transmission side is at least one of set, requested, communicated, and negotiated by or with said receiving side.

16. A method according to claim 10,
wherein said power back off process is performed to adjust transmission gain and/or transmission power in accordance to at least one of attenuations and distances to be bridged between devices under communication, or to reduce said transmission gain and/or transmission power for comparable short distances.

17. A method according to claim 1,
wherein transmission gain and/or transmission power are raised to increase a possible quality of service value or QoS value for quality of service data streams or QoS streams.

18. A method according to claim 17,
wherein information and/or signal components which need a higher QoS value are assigned and mapped to certain carriers and
wherein said certain carriers are given an increased amplitude and/or transmission power in the power line communication process.

19. A method according to claim 17,
wherein said increased amplitude and/or transmission power for the power line communication process are achieved by operating a respective spectral interleaver device to assign and map said information and bits which need a higher QoS value to said respective carriers.

20. A method according to claim 17,
wherein said process of raising said transmission gain and/or transmission power is performed in a way still enabling and/or maintaining
avoiding and de-allocating partly or completely least one of communication spectra and communication channels of devices and services other than devices and services associated in said communication, and/or
avoiding and de-allocating partly or completely at least one of communication spectra and communication channels associated with one or a plurality of amateur, AM or DRM radio services.

21. A method according to claim 1,
further comprising at least one of
detecting at least one communication partner device, which is connected to said PLC modem device via at least one communication channel, and
detecting said at least one communication channel between said PLC modem device and at least one communication partner device.

22. A method according to claim 4,
wherein said at least one of generating and providing communication quality data comprises a process of determining and/or measuring noise of said at least one communication channel, or of a power line thereof.

23. A method according to claim 4,
wherein said generating and/or providing communication quality data comprises a process of determining and/or measuring a signal attenuation of said at least one communication channel, or of a power line thereof.

24. A method according to claim 4,
wherein said generating and/or providing communication quality data comprises a process of determining and/or measuring a signal transmission level of said at least one communication channel, or of a power line thereof.

25. A method according to claim 4,
wherein said generating and/or providing communication quality data comprises a process of determining and/or measuring a distance of said PLC modem device to said communication partner device with respect to said at least one communication channel, or with respect to a power line thereof.

26. A method according to claim 4,
wherein said generating and/or providing communication quality data comprises a process of determining and/or measuring a signal-to-noise ratio with respect to said at least one communication channel, or of a power line thereof and/or based on said noise, attenuation, signal transmission level, distance determined and/or measured.

27. A method according to claim 1,
wherein for said at least one communication partner device a plurality of communication channels, of all available communication channels, are analyzed, within said detecting said at least one communication partner device and/or said at least one communication channel, within said generating and/or providing said communication quality data, within said determining at least said communication spectrum data and/or said communication channel data, and/or within said determining and/or selecting said communication spectrum and/or said communication channel.

28. A method according to claim 1,
wherein a communication spectrum and/or a communication channel are selected and/or used which are not simultaneously used by communication processes of and/or between other communication partner devices within said communication network or communication arrangement, or within said determining and/or selecting a communication spectrum and/or a communication channel.

29. A method according to claim 1,
wherein for a communication channel having or realizing a larger communication distance between said PLC modem device and said selected communication partner device a lower frequency range is chosen for said communication spectrum, or within said determining and/or selecting a communication spectrum.

30. A method according to claim 1,
wherein for a communication channel having or realizing a shorter communication distance between said PLC modem device and said selected communication partner device a communication spectrum with higher frequency range is chosen, or within said determining and/or selecting a communication spectrum.

31. A method according to claim 1,
wherein a process of checking at least one of the presence, existence and activity of at least one of other and external radio sources and radio services is performed, or within at least one of said at least one of generating and providing communication quality data, within said determining of at least one of communication spectrum data and communication channel data, and said at least one of determining and selecting at least one of a communication spectrum and a communication channel,
wherein at least one of said communication quality data, said communication spectrum data, said communication channel data, said communication spectrum and said communication channel are chosen or selected to avoid spectral ranges where at least one of other and external radio sources and radio services at least one of exist, are present and are active,
to at least one of reduce and avoid at least one of disturbances and interferences with, to and/or from at least one of other and external radio sources and/or radio services.

32. A method according to claim 31,
wherein within said process of checking the presence, existence and/or activity of other and external radio sources and/or radio services PLC modem devices snoop in the air if there are any radio services and/or radio sources available, and
wherein if a relevant service and/or source is found at any frequency location the respective frequency band is omitted in power line communication.

33. A method according to claim 31,
wherein said process of checking the presence, existence and/or activity of other and external radio sources and/or radio services is performed in a wireless manner and/or in a wired manner.

34. A method according to claim 1,
wherein a pre-defined reference signal is generated by at least one PLC modem device and transmitted via at least one available communication channel,
wherein possible communication partner devices measure said pre-defined reference signal via said at least one available communication channel and/or analyze the respective measurement data,
wherein based on said measurements said communication quality data, said communication spectrum data, said communication channel data, said communication spectrum and/or said communication channel are chosen or selected, or to avoid spectral ranges where other and external radio sources and/or radio services exist, are present and/or are active.

35. A method according to claim 2,
wherein said at least one PLC modem device and/or said possible communication partner devices communicate and/or transmit the respective measurement data, its respective analysis results, said communication quality data, said communication spectrum data, said communication channel data, said communication spectrum and/or said communication channel to said possible communication partner devices and/or said at least one PLC modem device.

36. A method according to claim 1,
wherein said processes of generating, of transmitting said pre-defined reference signal, of measuring, of analyzing the measurement, and/or of communicating the respective data to said possible communication partner devices and/or said at least one PLC modem device are performed during said generating and/or providing communication quality data, within said determining at least communication spectrum data and/or communication channel data, and/or within said determining and/or selecting a communication spectrum and/or a communication channel.

37. A PLC modem device, which is capable of and which comprises means for realizing the method for operating a PLC modem device according to claim 1.

38. A PLC communication or modem device according to claim 37, comprising:
means for monitoring a presence of interferences caused by operating other PLC modem devices, caused by a communication line used for own power line communication and/or from operating radio services, and
means for performing power line communication in the case that interferences from said operating other PLC modem devices, form said communication line used for own power line communication and/or from said operating radio services are detected at most or essentially on communication channels or communication spectra where said interferences from other PLC modem devices or from radio services are not detected,
thereby being adapted for simultaneously avoiding interferences to and from other PLC modem devices and radio services.

39. A PLC communication or modem device according to claim 37, comprising:
means for performing at least one of generating and providing communication quality data with respect to at least one communication channel between said PLC modern device and at least one communication partner device, said communication quality data being descriptive for at least one of communication capabilities, communication quality and communication features of at least one of said at least one communication partner device and said at least one communication channel, means for performing determining at least one of communication spectrum data and communication channel data based on said communication quality data and being descriptive for at least one of at least one communication spectrum for said PLC modem device and for said at least one communication channel each of which with respect to said at least one communication partner device, means for performing at least one of determining and selecting at least one of a communication spectrum and a communication channel from said at least one communication channel each of which based on at least one of said communication spectrum data and on said communication channel data, and means for performing communicating with said at least one communication partner device via at least one of said selected communication channel and said selected communication spectrum, said PLC modem device being adapted to monitor by a measurement process at least one of possible communication channels and communication spectra within said means for performing said at least one of generating and providing said communication quality data and wherein said means for performing said at least one of determining and selecting at least one of a communication spectrum and a communication channel is adapted to at least one of select and choose at least one of an actual communication spectrum and an actual communication channel for said communicating for which a comparable low interference from signal sources or signals other than the communication partner devices associated in said communicating and the signal stemming there from, respectively, is given, thereby being adapted to avoid and de-allocate partly or completely at least one of communication spectra and communication channels of devices and services other than devices and services associated in said communication, and thereby being adapted to avoid and de-allocate partly or completely at least one of communication spectra and communication channels associated with one or a plurality of amateur, AM or DRM radio services.

40. A PLC communication or modem device according to claim 37, comprising means for at least one of wirelessly and by wire receiving at least one of radio sources and radio services.

41. A PLC communication or modem device according claim 37, comprising a terrestrial tuner device and/or an antenna device for receiving radio sources and/or radio services.

42. A PLC communication or modem device according to claim 37, comprising an antenna device and an antenna interface connected thereto for receiving radio sources and/or radio services and for feeding and providing respective signals for evaluation.

43. A PLC communication or modem device according to claim 37, comprising a power line sensing means and/or a terrestrial tuner device and a power line interface connected thereto for receiving radio sources and/or radio services and for feeding and providing respective signals for evaluation.

44. A PLC communication or modem device according to claim 37, comprising an evaluating and estimation unit for evaluating radiations and/or noise and for estimating channel.

45. A PLC communication or modem device according to claim 37, comprising a central processing unit connected to said antenna interface and/or to said power line interface, and configured to control the same.

46. A communication arrangement,
which is capable of and which comprises means for realizing the method for operating a communication arrangement according to claim 1.

47. A communication arrangement, comprising a plurality of PLC communication or modem devices according to claim 37.

48. A computer program product, comprising computer program means capable of performing and realizing the method for operating communication arrangement according to claim 1, when it is executed on a computer or a digital signal processing means.

49. A computer readable storage medium, comprising a computer program product according to claim 48.

* * * * *